(12) United States Patent
Omoda

(10) Patent No.: US 12,355,036 B2
(45) Date of Patent: Jul. 8, 2025

(54) ALL-SOLID-STATE RECHARGEABLE BATTERY AND STACKED ALL-SOLID-STATE RECHARGEABLE BATTERY

(71) Applicant: SAMSUNG SDI CO., LTD., Yongin-si (KR)

(72) Inventor: Ryo Omoda, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 483 days.

(21) Appl. No.: 17/849,429

(22) Filed: Jun. 24, 2022

(65) Prior Publication Data

US 2022/0416308 A1 Dec. 29, 2022

(30) Foreign Application Priority Data

Jun. 28, 2021 (JP) ................................ 2021-106439
Jan. 17, 2022 (KR) ........................ 10-2022-0006545

(51) Int. Cl.
*H01M 10/058* (2010.01)
*H01M 4/38* (2006.01)
(Continued)

(52) U.S. Cl.
CPC ......... *H01M 10/0585* (2013.01); *H01M 4/38* (2013.01); *H01M 4/587* (2013.01);
(Continued)

(58) Field of Classification Search
CPC ........... H01M 10/0585; H01M 10/052; H01M 10/0525; H01M 10/0562; H01M 50/531;
(Continued)

(56) References Cited

U.S. PATENT DOCUMENTS 9,627,149 B2 4/2017 Chen et al.
9,825,301 B2 11/2017 Kim et al.
(Continued)

FOREIGN PATENT DOCUMENTS

JP 2004-158222 A 6/2004
JP 2007-273436 A 10/2007
(Continued)

OTHER PUBLICATIONS

Extended European Search Report dated Nov. 24, 2022, of the corresponding European Patent Application No. 22181462.7 (9 pages).
(Continued)

*Primary Examiner* — Raymond Alejandro
(74) *Attorney, Agent, or Firm* — Womble Bond Dickinson (US) LLP

(57) ABSTRACT

An all-solid-state rechargeable battery and a stacked all-solid-state rechargeable battery capable of reducing surface unevenness are provided. The battery makes it more difficult to crack a current collecting unit and to cut the current collecting unit, and the battery may be easily manufactured. The all-solid-state rechargeable battery includes positive and negative electrode layers; solid electrolyte layers stacked between the positive and negative electrode layers; an insulating layer on a side end surface of the positive electrode layer that covers the positive electrode layer; and thin type positive and negative electrode current collecting units protruding laterally from the positive and negative electrode layers, respectively. The insulating layer supports the positive and negative electrode current collecting units from at least one side. Two conductive units electrically connecting each of the positive and negative electrode current collecting units to an external wiring are formed in the insulating layer.

16 Claims, 22 Drawing Sheets

(51) Int. Cl.
  *H01M 4/587* (2010.01)
  *H01M 4/62* (2006.01)
  *H01M 10/0525* (2010.01)
  *H01M 10/0562* (2010.01)
  *H01M 10/0585* (2010.01)
  *H01M 50/531* (2021.01)
  *H01M 4/02* (2006.01)

(52) U.S. Cl.
  CPC ....... *H01M 4/628* (2013.01); *H01M 10/0525* (2013.01); *H01M 10/0562* (2013.01); *H01M 50/531* (2021.01); *H01M 2004/027* (2013.01); *H01M 2300/0068* (2013.01)

(58) Field of Classification Search
  CPC ........ H01M 4/38; H01M 4/587; H01M 4/628; H01M 2004/027; H01M 2300/0068
  See application file for complete search history.

(56) References Cited

U.S. PATENT DOCUMENTS

| | | |
|---|---|---|
| 2005/0019663 A1 | 1/2005 | Nanno et al. |
| 2012/0171549 A1 | 7/2012 | Ouchi et al. |
| 2017/0125826 A1 | 5/2017 | Noponen et al. |
| 2018/0212210 A1 | 7/2018 | Suzuki |
| 2018/0294469 A1* | 10/2018 | Hasegawa ......... H01M 10/0562 |
| 2019/0123355 A1 | 4/2019 | Ebisuzaki et al. |
| 2019/0157656 A1 | 5/2019 | Li et al. |
| 2019/0214677 A1 | 7/2019 | Yamada et al. |
| 2020/0212450 A1 | 7/2020 | Shimizu et al. |
| 2020/0259128 A1* | 8/2020 | Tanaka .................. H01M 4/661 |
| 2020/0266494 A1 | 8/2020 | Takeuchi et al. |
| 2021/0066758 A1 | 3/2021 | Tomoyuki et al. |
| 2022/0013846 A1* | 1/2022 | Nishide ............... H01M 50/593 |

FOREIGN PATENT DOCUMENTS

| | | |
|---|---|---|
| JP | 4617105 B2 | 1/2011 |
| JP | 2013-101860 A | 5/2013 |
| JP | 5397475 B2 | 1/2014 |
| JP | 2017-117672 A | 6/2017 |
| JP | 2017-523567 A | 8/2017 |
| JP | 2019-079611 A | 5/2019 |
| JP | 2019-121558 A | 7/2019 |
| JP | 2019-175736 A | 10/2019 |
| JP | 2020-107441 A | 7/2020 |
| JP | 2020-123536 A | 8/2020 |
| JP | 6734884 B2 | 8/2020 |
| JP | 6772855 B2 | 10/2020 |
| JP | 2021-039876 A | 3/2021 |
| JP | 2022-044461 A | 3/2022 |
| KR | 10-2021-0027023 A | 3/2021 |
| WO | WO 2019-093221 A1 | 5/2019 |

OTHER PUBLICATIONS

Korean Office Action dated Jan. 29, 2024 of the corresponding Korean Patent Application No. 10-2022-0006545 (6 pages).
Japanese Office Action dated Jun. 3, 2025, of the corresponding Japanese Patent Application No. 2021-106439 (4 pages).

* cited by examiner

FIG. 3
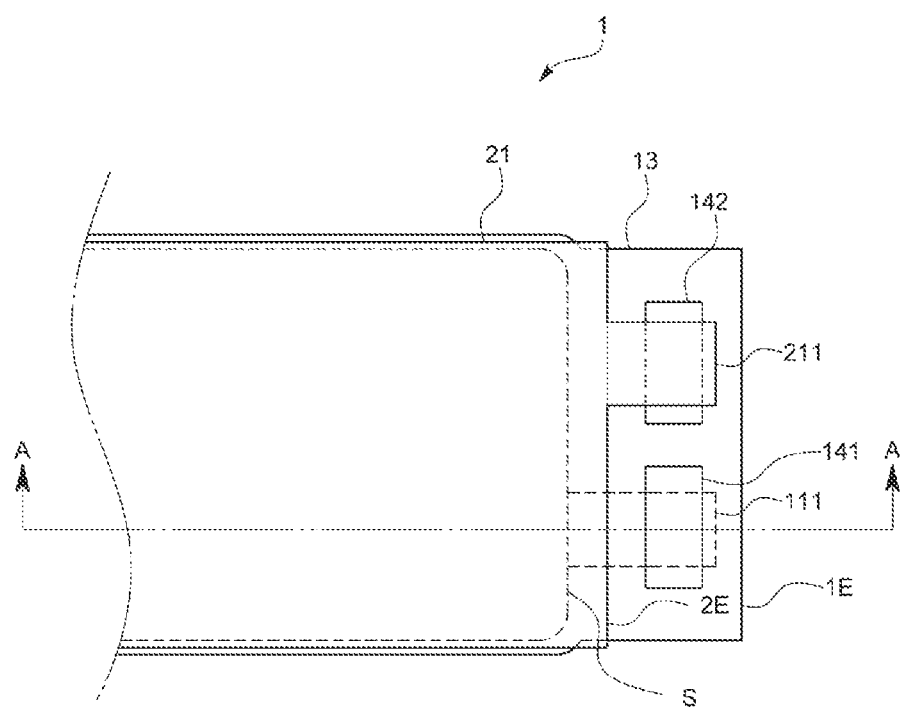
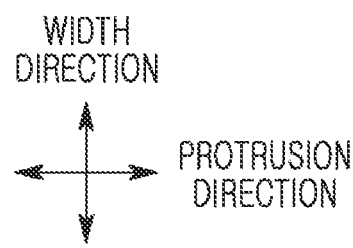

ALL-SOLID-STATE RECHARGEABLE BATTERY AND STACKED ALL-SOLID-STATE RECHARGEABLE BATTERY

CROSS-REFERENCE TO RELATED APPLICATIONS

This application claims priority to and the benefit of Japanese Patent Application No. 2021-106439 filed in the Japan Patent Office on Jun. 28, 2021, and Korean Patent Application No. 10-2022-0006545 filed in the Korean Intellectual Property Office on Jan. 17, 2022, the entire contents of which are hereby incorporated by reference.

BACKGROUND

1. Field

Aspects of one or more embodiments of the present invention relate to an all-solid-state rechargeable battery and a stacked all-solid-state rechargeable battery.

2. Description of the Related Art

In order to improve the energy density of an all-solid-state rechargeable battery and to realize a high-capacity battery pack, it is required to stack and utilize a plurality of all-solid-state rechargeable batteries.

When a plurality of all-solid-state rechargeable batteries are stacked and utilized as described above, in order to improve a rate characteristic or a cycle characteristic due to suppression of a short circuit, for each all-solid-state rechargeable battery (also referred to as a single cell), the all-solid-state rechargeable battery is in a shape in which two solid electrolyte layers are stacked on both (e.g., opposite) surfaces (e.g., sides) of a positive electrode layer, respectively, and then is inserted between two negative electrode layers from the outside of the two solid electrolyte layers, and it is preferable to reduce a surface unevenness of the negative electrode layer, which is the outermost layer, to reduce the physical influence on an adjacent all-solid-state rechargeable battery.

Therefore, in Patent Document 1 (i.e., Japanese Patent Publication No. 2019-121558, the entire content of which is hereby incorporated by reference), an all-solid-state rechargeable battery that further reduces a surface unevenness by laminate-packing a stack structure for forming a single cell having the above-described configuration in a state of being placed on a support plate, and pressing the stack structure from a stack direction by isostatic press is manufactured.

In the all-solid-state rechargeable battery manufactured by pressing the stack structure from the stack direction by isostatic press as described above, it may be seen that a problem that a charging/discharging capacity cannot be exhibited may occur.

As a result of repeated review by the inventor(s) of the present disclosure, the inventor(s) discovered that the cause of this problem is that a part of a current collecting unit, which is a thin type or kind protruding part provided to electrically connect the positive electrode layer to an external wiring is cracked, and the current collecting unit is cut.

Therefore, in order to further reduce a probability that the current collecting unit part is cracked or cut, the inventor(s) of the present disclosure considered covering the current collecting unit with an insulating protective member on both surfaces when performing an isostatic press.

However, according to such a manufacturing method, in order to electrically connect the current collecting unit to the external wiring, it is necessary to remove the protective member after isostatic press is finished.

This process is sufficiently simpler, for example, than a process of reconnecting the cut current collecting unit to the positive electrode layer.

Nevertheless, it is inevitable that a new process is added to the manufacturing process of the all-solid-state rechargeable battery.

In some embodiments, when a stacked all-solid-state rechargeable battery is manufactured by stacking a plurality of all-solid-state rechargeable batteries (single cells) provided with the above-described protective member, it is necessary to stack a plurality of these single cells after removing the protective member.

For this reason, an isostatic press on the single cells needs to be performed one by one (cell by cell).

In some embodiments, when the protective member is removed, because a gap is generated between single cells, there is a problem in that the possibility that a part of the current collecting unit is cracked or that the current collecting unit is cut is increased when the stacked all-solid-state rechargeable battery is laminate-packed, etc.

When an isostatic press is performed at once in a state in which a plurality of stack structures for a single cell are stacked before isostatic press, the protective member is fixed in a state inserted between both surfaces (e.g., sides) by the current collecting unit corresponding to the plurality of single cells.

As a result, a problem in that it is difficult to remove the protective member also occurs.

The above information disclosed in this Background section is merely for enhancement of understanding of the background of the present disclosure, and therefore it may contain information that does not form the prior art to a person of ordinary skill in the art.

SUMMARY

An aspect of one or more embodiments of the present disclosure has been made in an effort to provide an all-solid-state rechargeable battery and a stacked all-solid-state rechargeable battery having features of reducing surface unevenness, making it more difficult to crack a current collecting unit than in the prior art, making it more difficult to cut the current collecting unit than in the prior art, and being easily manufactured.

Additional aspects will be set forth in part in the description which follows and, in part, will be apparent from the description, or may be learned by practice of the presented embodiments of the disclosure.

An embodiment of the present disclosure is directed toward an all-solid-state rechargeable battery including a positive electrode layer, a negative electrode layer, and solid electrolyte layers stacked between the positive electrode layer and the negative electrode layer. The all-solid-state rechargeable battery further includes an insulating layer on a side end surface (e.g., a side) of the positive electrode layer to cover the positive electrode layer; a thin type or kind positive electrode current collecting unit protruding laterally from the positive electrode layer; and a thin type or kind negative electrode current collecting unit protruding laterally from the negative electrode layer, wherein the insulating layer is configured to support the positive electrode current collecting unit and the negative electrode current collecting unit from at least one side of the positive electrode current collecting unit and at least one side of the negative collecting unit. A plurality of conductive units (e.g., conductors) electrically connecting each of the positive electrode current collecting units and the negative electrode current collecting units to an external wiring are formed in the insulating layer, and the plurality of conductive units are formed to penetrate the insulating layer in the stack direction (e.g., thickness direction).

According to the all-solid-state rechargeable battery configured as described above, an isostatic pressure may be applied while the positive electrode current collecting unit and the negative electrode current collecting unit are supported from at least one side by an insulating layer. As a result, the insulating layer functions as a protective member protecting a current collecting unit, and may suppress or reduce the occurrence of a crack in the positive electrode current collecting unit and/or the negative current collecting unit, or cutting of the positive electrode current collecting unit and/or the negative current collecting unit when pressed. In some embodiments, because a conductive unit connecting each of the positive electrode current collecting units and the negative current collecting units to an external wiring is provided so as to penetrate the insulating layer, when the all-solid-state rechargeable battery is utilized, or when the stacked all-solid-state rechargeable battery is manufactured by stacking all-solid-state rechargeable batteries, the insulating layer is not disturbed. The inconvenience of removing a part of the insulating layer supporting the positive electrode current collecting unit and/or the negative current collecting unit maybe avoided.

In an embodiment of the present disclosure, the plurality of conductive units may be disposed at positions not in direct contact with each other.

In an embodiment of the present disclosure, two of the plurality of conductive units may be formed so as to face each other in the stack direction with the current collecting unit interposed therebetween.

The solid electrolyte layer may be stacked on both surfaces of the positive electrode layer, the negative electrode layer may be stacked on an opposite surface (e.g., opposite side) to the positive electrode layer of each of the solid electrolyte layers, and the insulating layer may be inserted with and may support the positive electrode current collecting unit from the stack direction of each of the layers.

The conductive unit may be formed of a material having an electrical conductivity equal to or greater than 106 S/m.

For example, the conductive unit may include a composite containing one type or kind of material or two or more types (kinds) of material selected from the group including (e.g., consisting of) metal, alloy, metal powder, carbon material and electronically conductive polymer, or a composite containing one or more combinations of the foregoing materials and a resin.

In an embodiment of the present disclosure, the insulating layer may be made of a resin or may contain a resin.

When the insulating layer further contains an insulating filler, the strength of the insulating layer may be improved by improving the adhesion between materials forming the insulating layer by the insulating filler.

The insulating filler may include one or more types (kinds) of materials selected from the group including (e.g., consisting of) fibrous resin, resin nonwoven fabric, alumina, magnesium oxide, silica, boehmite, barium titanate, barium carbonate, yttrium oxide, manganese oxide, etc.

In one or more embodiments, a part or whole (all) of an outer edge of the insulating layer in a side in which the current collecting unit protrudes may be located outside an outer edge of the second electrode layer, because a short circuit due to a physical contact between a positive electrode layer and a negative electrode layer may be suppressed or reduced.

In order to suppress or reduce a short circuit between the positive electrode layer and the negative electrode layer, a part or whole (all) of the outer edge of the negative electrode layer may be on the insulating layer.

The all-solid-state rechargeable battery in which the solid electrolyte layer contains a sulfide-based solid electrolyte containing at least lithium, phosphorus and sulfur is preferable because the battery performance may be further improved.

The negative electrode layer may include a negative electrode active material that forms an alloy with lithium and/or a negative electrode active material that forms a compound with lithium, metallic lithium is educible inside the negative electrode layer during charging, and a charging capacity of the negative electrode layer equal to or greater than 80% is exhibited by metallic lithium.

In an embodiment of the present disclosure, the negative electrode layer may include one or more selected from the group including (e.g., consisting of) amorphous carbon, gold, platinum, palladium, silicon, silver, aluminum, bismuth, tin, and zinc.

According to the present disclosure, the manufacturing method of the all-solid-state battery may include a homogeneous pressing process, thereby flattening the surface unevenness of the all-solid-state rechargeable battery.

In some embodiments, the positive electrode current collector and the negative electrode current collector are protected by the insulating layer from at least one (side) surface thereof while being pressed, thereby further suppressing the probability that a crack is generated at the root of the positive electrode current collector and the negative current collector, or that the positive electrode current collector and the negative current collector are cut.

In some embodiments, the two conductive units electrically connecting a corresponding one of the positive electrode current collecting units and a corresponding one of the negative electrode current collecting units to the external wiring may be formed so as to penetrate the insulating layer, and thus it is possible to utilize the all-solid-state rechargeable battery as it is, without inconveniently removing the insulating layer after pressure formation, or to manufacture the stacked all-solid-state rechargeable battery by stacking the all-solid-state rechargeable battery as it is.

BRIEF DESCRIPTION OF THE DRAWINGS

FIG. 3 is an enlarged plan view showing a schematic configuration of the all-solid-state rechargeable battery according to an embodiment.

DETAILED DESCRIPTION

Figure 1:
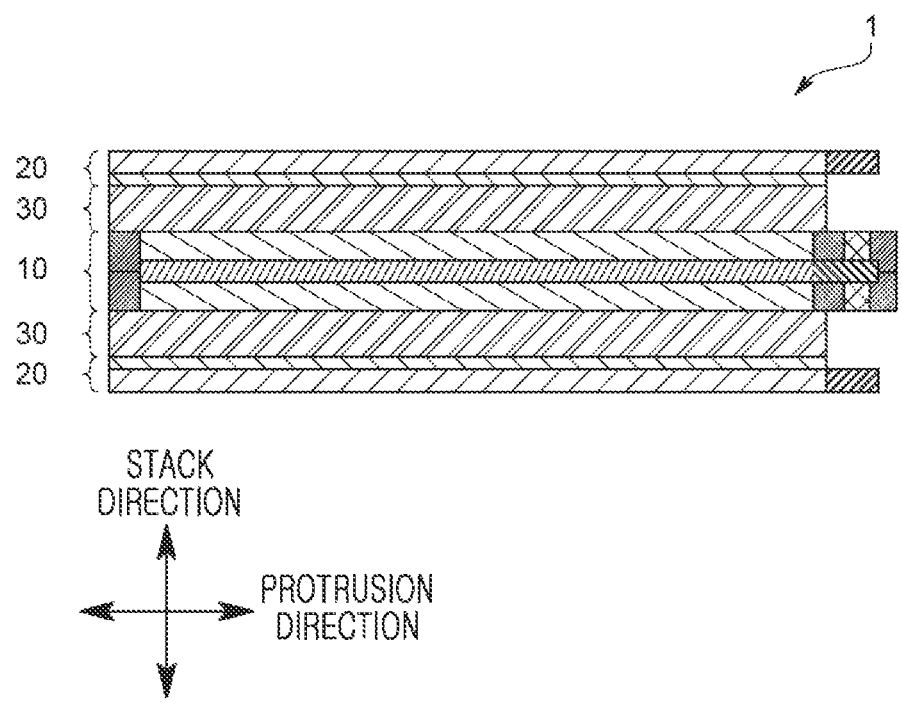
FIG. 1 is a cross-sectional view showing a schematic configuration of an all-solid-state rechargeable battery according to an embodiment.

Hereinafter, embodiments of the present will be described in more detail with reference to the accompanying drawings. In some embodiments, in the specification and drawings of the present, redundant descriptions are omitted because the same reference numerals are given to components having substantially the same functional configuration. In some embodiments, each component in the drawings is appropriately enlarged or reduced for ease of explanation, and the size and ratio of each component in the drawings may differ from actual ones.

1. Configuration of all-Solid-State Rechargeable Battery

First, the configuration of the all-solid-state rechargeable battery 1 according to an embodiment of the present disclosure will be described.

Figure 2:
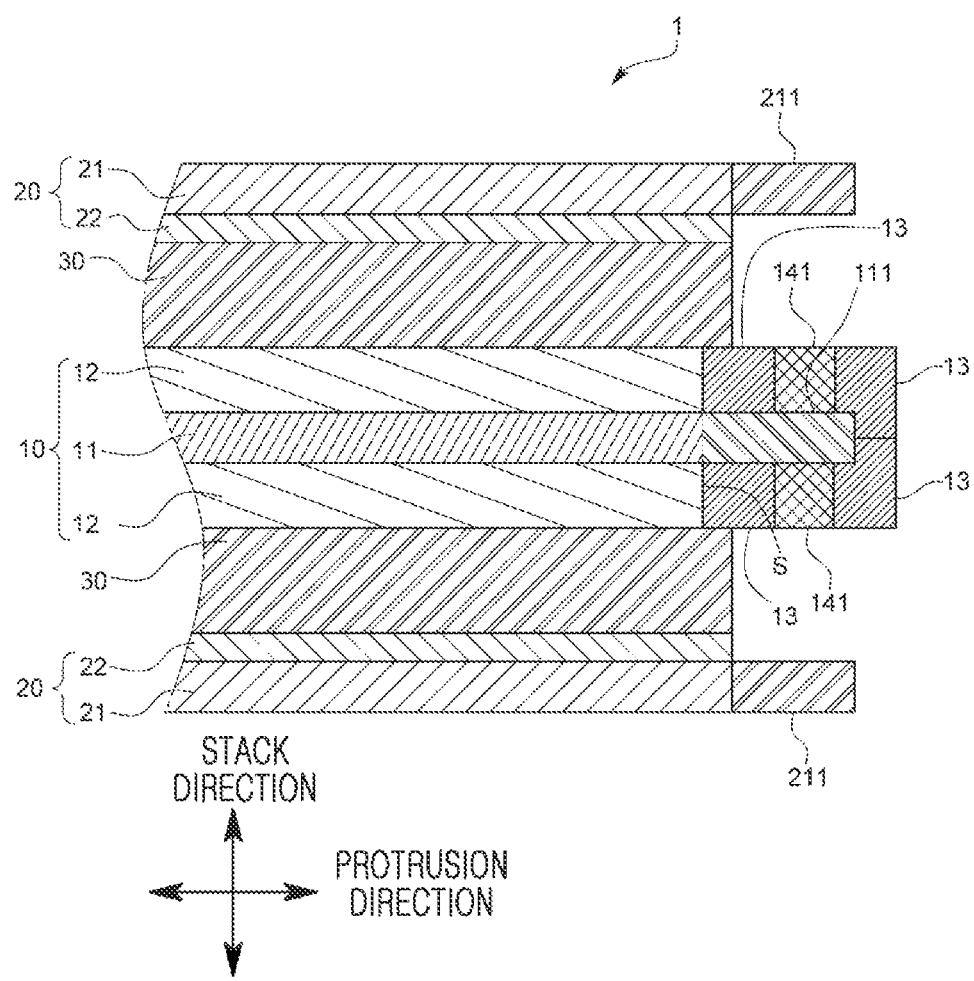
FIG. 2 is an enlarged cross-sectional view showing a schematic configuration of the all-solid-state rechargeable battery according to an embodiment.

The all-solid-state rechargeable battery 1 according to an embodiment may include a positive electrode layer 10, a negative electrode layer 20, and a solid electrolyte layer 30. For example, the all-solid-state rechargeable battery 1 may include one side (hereinafter, also referred to as a first electrode layer) of the positive electrode layer 10 or the negative electrode layer 20, the solid electrolyte layer 30 stacked on each of both surfaces of the first electrode layer, the other side (hereinafter, also referred to as a second electrode layer) of the positive electrode layer 10 and the negative electrode layer 20 stacked on each of a surface opposite to the first electrode layer of the solid electrolyte layer, and an insulating layer 13 on a side end surface S of the first electrode layer. In an embodiment, as shown in FIGS. 1 and 2, the first electrode layer may be a positive electrode layer 10 and the second electrode layer may be a negative electrode layer 20. In contrast, the side end surface is not a stack direction of each of the layers, but a peripheral end, and refers to an end of each layer in a direction perpendicular (and normal) to the stack direction of each of the layers.

1-1. Positive Electrode Layer

The positive electrode layer 10 may include a positive electrode current collector 11 and a positive electrode active material layer 12 as shown in FIG. 2.

Examples of the positive electrode current collector 11 may include a plate type or kind body or a thin type or kind body made of stainless steel, titanium (Ti), nickel (Ni), aluminum (Al), or an alloy thereof. The thickness of the positive electrode current collector 11 may be, for example, equal to or greater than 1 μm and equal to or less than 50 μm (e.g., from 1 μm to 50 μm), or equal to or greater than 5 μm and equal to or less than 30 μm.

The positive electrode active material layer 12 may be on both surfaces of the positive electrode current collector 11 as shown in FIG. 2. The positive electrode active material layer 12 may contain at least a positive electrode active material and/or a solid electrolyte.

The solid electrolyte contained in the positive electrode active material layer 12 may or may not be the same kind as that of the solid electrolyte contained in the solid electrolyte layer 30. The details of the solid electrolyte will be described in more detail in the section of the solid electrolyte layer 30.

The positive electrode active material may be any suitable positive electrode active material capable of reversibly occluding and releasing lithium ions.

For example, the positive electrode active material may be, for example, in a powdery or granular form, and may be formed utilizing lithium cobaltate (hereinafter referred to as LCO), lithium nickel oxide, lithium nickel cobalt oxide, nickel cobalt lithium aluminate (hereinafter referred to as NCA), nickel cobalt lithium manganate (hereinafter referred to as NCM), lithium salts such as lithium manganate, lithium iron phosphate, etc., nickel sulfide, copper sulfide, sulfur, iron oxide, vanadium oxide, etc. These positive electrode active materials may be utilized individually, respectively, and may be utilized in combination of two or more types (kinds).

In some embodiments, the positive electrode active material may be, for example, formed to include a lithium salt of a transition metal oxide having a layered rock salt structure among the lithium salts described above. Here, "layered" refers to a thin sheet type or kind shape. In some embodiments, "rock salt structure" may indicate a sodium chloride type or kind structure, which is a type or kind of crystal structure, and for example, a structure in which face-centered cubic lattices formed by each of cations and anions are displaced from each other by only ½ of corners of a unit lattice.

Examples of the lithium salt of the transition metal oxide having such a layered rock salt structure may include lithium salts of a ternary transition metal oxide such as $LiNi_xCo_y\!Al_zO_2$(NCA) or $LiNi_xCo_yMn_zO_2$(NCM) ($0<x<1$, $0<y<1$, $0<z<1$, and $x+y+z=1$), etc.

When the positive electrode active material includes the lithium salt of the ternary transition metal oxide having the layered rock salt structure, the energy density and thermal stability of the all-solid-state rechargeable battery 1 may be improved.

A surface of the positive electrode active material may be covered with a coating layer. The coating layer of the present embodiment may be any suitable coating layer as long as it is generally available/generally used as the coating layer of the positive electrode active material of the all-solid-state rechargeable battery 1. An example of the coating layer may include, for example, $Li_2O$—$ZrO_2$, etc.

In some embodiments, when the positive electrode active material is formed from the lithium salt of the ternary transition metal oxide such as NCA or NCM, and nickel (Ni) may be included as the positive electrode active material, the capacity density of the all-solid-state rechargeable battery 1 may be increased, and metal elution from the positive electrode active material in a charging state may be reduced. Accordingly, the all-solid-state rechargeable battery 1 according to the present embodiment may improve a long-term reliability and cycle characteristic in the charging state.

A shape of the positive electrode active material may include, for example, a particle shape such as a substantially spherical shape, an ellipsoidal shape, etc. In some embodiments, the particle diameter of the positive electrode active material is not limited, and may be within a range applicable to the positive electrode active material of the all-solid-state rechargeable battery of the prior art. In contrast, the content (e.g., amount) of the positive electrode active material in the positive electrode layer 10 is also not limited, and may be within a range applicable to the positive electrode layer 10 of the all-solid-state rechargeable battery 1 of the related art.

Further, in the positive electrode active material layer 12, in addition to the above-described positive electrode active material and solid electrolyte, for example, an additive such as a conductive auxiliary agent, a binder material, a filler, a dispersant, an ion conduction auxiliary agent, etc. may be suitably blended.

Examples of the conductive auxiliary agent that can be blended into the positive electrode active material layer 12 may include graphite, carbon black, acetylene black, Ketjen black, carbon fiber, carbon nanotube, graphene, metal powder, etc. In some embodiments, examples of the binder that can be blended into the positive electrode active material layer 12 may include styrene butadiene rubber (SBR), polytetrafluoroethylene, polyvinylidene fluoride, polyethylene, etc. In some embodiments, as the filler, the dispersant, the ion conduction auxiliary agent, etc. which can be blended into the positive electrode active material layer 12, a generally available/generally used material for the electrode of the all-solid-state rechargeable battery 1 may be utilized.

The thickness of the positive electrode active material layer 12 in a state completed as a battery is not limited, but, for example, may be equal to or greater than 20 μm and equal to or less than 1000 μm, or equal to or greater than 50 μm and equal to or less than 500 μm, or equal to or greater than 100 μm and equal to or less than 300 μm.

1-2. Negative Electrode Layer

The negative electrode layer 20 includes, for example, as shown in FIG. 2, a plate type or kind or thin type or kind negative electrode current collector 21, and a negative electrode active material layer 22 formed on the negative electrode current collector 21.

The negative electrode current collector 21 forms the outermost layer of the all-solid-state rechargeable battery 1 in the present embodiment.

The negative electrode current collector 21 may be configured as a material that does not react with lithium, for example, forms neither an alloy nor a compound with lithium.

Examples of the material constituting the negative electrode current collector 21 may include copper (Cu), titanium (Ti), iron (Fe), cobalt (Co), and/or nickel (Ni) in addition to stainless steel.

The negative electrode current collector 21 may be configured as any one type or kind of these metals, or may be configured as an alloy of two or more types (kinds) of metals or a cladding material.

The thickness of the negative electrode current collector 21 may be, for example, equal to or greater than 1 μm and equal to or less than 50 μm, or equal to or greater than 5 μm and equal to or less than 30 μm.

The negative electrode active material layer 22 may include, for example, at least one of a negative electrode active material forming an alloy with lithium and a negative electrode active material forming a compound with lithium. In some embodiments, the negative electrode active material layer 22 may contain such a negative electrode active material so that metallic lithium may be educed on one surface or both surfaces of the negative electrode active material layer 22, as described below.

Examples of the negative active material may include amorphous carbon, gold, platinum, palladium (Pd), silicon (Si), aluminum (Al), bismuth (Bi), tin, antimony, zinc, etc.

Examples of the amorphous carbon may include carbon black, such as acetylene black, furnace black, Ketjen black, etc., graphene, etc.

The shape of the negative electrode active material is not limited, and may be granular, for example, may be a substantially uniform layer such as a plating layer.

In the former embodiment, lithium ion or lithium may pass through the inside of the granular negative electrode active material or a gap between negative electrode active materials, a metal layer primarily made of lithium between the negative electrode active material layer 22 and the negative electrode current collector 21 is formed, and some lithium is present in the negative electrode active material layer 22 by forming an alloy with a metal element in the negative electrode active material.

In contrast, in the latter embodiment, the metal layer may be educed between the negative electrode active material layer 22 and the solid electrolyte layer 30.

Among those described above, the negative electrode active material layer 22 may, for example, include, as amorphous carbon, low specific surface area amorphous carbon having a specific surface area equal to or less than 100 $m^2$/g measured utilizing a nitrogen gas adsorption method, and high specific surface area amorphous carbon having a specific surface area equal to or greater than 300 m²/g measured utilizing the nitrogen gas adsorption method.

The negative electrode active material layer 22 may contain any one type or kind of these negative electrode active materials, and may contain two or more types (kinds) of negative electrode active materials. For example, the negative electrode active material layer 22 may contain only amorphous carbon as the negative electrode active material, and may contain one or more type or kind selected from the group including (e.g., consisting of) gold, platinum, palladium, silicon, silver, aluminum, bismuth, tin, antimony and zinc. Further, the negative electrode active material layer 22 may contain a mixture of amorphous carbon and one or more type or kind selected from the group including (e.g., consisting of) gold, platinum, palladium, silicon, silver, aluminum, bismuth, tin, antimony, and zinc.

The mixing ratio (mass ratio) of the mixture of amorphous carbon and the above-described metal such as gold may be about 1:1 to 1:3, and the negative electrode active material may be configured as these materials, so that the characteristics of the all-solid-state rechargeable battery 1 are further improved.

When any one or more types (kinds) selected from the group including (e.g., consisting of) gold, platinum, palladium, silicon, silver, aluminum, bismuth, tin, antimony and zinc together with amorphous carbon are utilized as the negative electrode active material, the average particle diameter of the negative active material in the form of particles (i.e., in particle form) may be equal to or less than 4 μm. The average particle diameter of the active material may be, for example, a median diameter (D50) measured using a laser diffraction particle diameter distribution meter. In this embodiment, the characteristics of the all-solid-state rechargeable battery 1 may be further improved.

In some embodiments, as the negative electrode active material, when any one or more types (kinds) selected from the group including (e.g., consisting of) a material capable of forming an alloy with lithium, for example, gold, platinum, palladium, silicon, silver, aluminum, bismuth, tin, antimony, and zinc are utilized, the negative electrode active material layer 22 may be a layer made of these metals. For example, this metal layer may be a plating layer.

The negative electrode active material layer 22 may further include a binder as needed. Examples of the binder may include styrene-butadiene rubber (SBR), polytetrafluoroethylene (PTFE), polyvinylidene fluoride, polyethylene oxide, etc. The binder may be configured as one type or kind among these, or may be configured as two or more types (kinds). By including the binder in the negative electrode active material layer 22 as described above, especially when the negative electrode active material has a granular shape or form, it is possible to suppress or reduce the separation of the negative electrode active material. The content (e.g., amount) ratio of the binder contained in the negative electrode active material layer 22 may be, for example, equal to or greater than 0.3% by mass (or wt %) and equal to or less than 20.0% by mass (or wt %), or equal to or greater than 1.0% by mass and equal to or less than 15.0% by mass, or, equal to or greater than 3.0% by mass (mass % or wt %) and equal to or less than 15.0 mass % with respect to the total mass of the negative electrode active material layer 22.

In some embodiments, an additive utilized in the all-solid-state rechargeable battery 1 of the prior art, for example, a filler, a dispersion material, an ion conductive material, etc., may be suitably blended into the negative electrode active material layer 22.

The thickness of the negative electrode active material layer 22 is not limited, but when the negative electrode active material is a granular shape, for example, the thickness in a state completed as a battery may be, for example, equal to or greater than 1 μm and equal to or less than 30 μm, or equal to or greater than 5 μm and equal to or less than 20 μm. By setting the thickness as described above, the resistance value of the negative electrode active material layer 22 may be sufficiently reduced while sufficiently obtaining the above-described effect of the negative electrode active material layer 22, and the characteristics of the all-solid-state rechargeable battery 1 may be sufficiently improved.

In contrast, the thickness of the negative electrode active material layer 22 may be, for example, equal to or greater than 1 nm and equal to or less than 100 nm when the negative electrode active material forms a substantially uniform layer. The upper limit of the thickness of the negative electrode active material layer 22 in this embodiment may be 95 nm, or 90 nm, or 50 nm (e.g., from 95 nm to 50 nm).

The present disclosure is not limited to the above-described embodiment, and it is possible for the negative electrode active material layer 22 to adopt any suitable structure usable as the negative electrode active material layer 22 of the all-solid-state rechargeable battery 1.

For example, the negative electrode active material layer 22 may be a layer including the above-described negative electrode active material, a solid electrolyte, and a negative electrode layer conductive auxiliary agent.

In this embodiment, for example, a metal active material or a carbon active material may be utilized as the negative electrode active material. As the metal active material, for example, metal, such as lithium (Li), indium (In), aluminum (Al), tin (Sn), silicon (Si), etc. and/or an alloy thereof, etc. may be utilized. In some embodiments, as the carbon active material, for example, artificial graphite, graphite carbon fiber, plasticized carbon, pyrolytic vapor-grown carbon, coke, mesocarbon microbeads (MCMB), furfuryl alcohol resinous carbon, polyacene, pitch-based carbon fiber, vapor-grown carbon fiber, natural graphite, non-graphitizable carbon, etc. may be utilized. In some embodiments, these negative electrode active materials may be utilized independently and/or may be utilized in combination of two or more types (kinds).

As the negative electrode layer conductive auxiliary agent and the solid electrolyte, a compound such as a conductive agent and a solid electrolyte included in the positive electrode active material layer 12 may be utilized. For this reason, the descriptions of these structures are omitted herein.

1-3. Solid Electrolyte Layer

The solid electrolyte layer 30 may be a layer formed between the positive electrode layer 10 and the negative electrode layer 20 and includes a solid electrolyte.

In the present embodiment, the solid electrolyte layer 30 may be stacked between the positive electrode layer 10 and the negative electrode layer 20.

The thickness of the solid electrolyte layer 30 may be equal to or greater than 5 μm and equal to or less than 100 μm in a state completed as a battery. The thickness may be equal to or greater than 8 micrometers and equal to or less than 80 micrometers, or equal to or greater than 10 micrometers and equal to or less than 50 micrometers.

The solid electrolyte may be, for example, in a powder form, and may be configured as, for example, a sulfide-based solid electrolyte material.

Examples of the sulfide-based solid electrolyte material may include $Li_2S$—$P_2S_5$, $Li_2S$—$P_2S_5$—LiX (X is a halogen element, for example, I, Br, Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are numbers, and Z is one of Ge, Zn, or Ga), $Li_2S$—$GeS_2$, $Li_2S$—$SiS_2$—$Li_3PO_4$, $Li_2S$—$SiS_2$—$Li_pMO_q$ (p and q are numbers, and M is one of P, Si, Ge, B, Al, Ga, or In), etc. The sulfide-based solid electrolyte material may be prepared by treating a starting raw material (e.g., $Li_2S$, $P_2S_5$, etc.) utilizing a melt quenching method or a mechanical milling method. In some embodiments, heat-treatment may be also performed after treatment of these methods. The solid electrolyte may be amorphous, crystalline, or a mixture of both (e.g., simultaneously).

Further, as the solid electrolyte, a material containing one or more types (kinds) of an element selected from the group including (e.g., consisting of) sulfur, silicon, phosphorus and boron among the above sulfide-based solid electrolyte materials may be utilized. Accordingly, the lithium conductivity of the solid electrolyte layer 30 may be improved, and the battery characteristics of the all-solid-state rechargeable battery 1 may be improved. For example, a solid electrolyte including at least sulfur (S), phosphorus (P) and lithium (Li) as constituent elements may be utilized, or use a solid electrolyte including, for example, $Li_2S$—$P_2S_5$ may be utilized.

When the solid electrolyte including $Li_2S$—$P_2S_5$ as the sulfide-based solid electrolyte material for forming the solid electrolyte is utilized, the mixing molar ratio of $Li_2S$ and $P_2S_5$ may be selected from the range of, for example, $Li_2S:P_2S_5=50:5090:10$. In some embodiments, the solid electrolyte layer 30 may further include a binder. Examples of the binder included in the solid electrolyte layer 30 may include styrene-butadiene rubber (SBR), polytetrafluoroethylene (PTFE), polyvinylidene fluoride (PVDF), polyethylene (PE), polyacrylic acid (PAA), etc. The binder included in the solid electrolyte layer 30 may be of the same type or kind as the binder in the positive electrode active material layer 12 and the negative electrode active material layer 22, or may be of a different type or kind.

1-4. Current Collecting Unit

The positive electrode current collector 11 and the negative electrode current collector 21 are connected to an external wiring with a current collecting unit interposed therebetween. The current collecting unit may include, for example, as shown in FIGS. 2 and 3, a positive electrode current collecting unit 111 electrically connected to the positive electrode current collector 11 and a negative electrode current collecting unit 211 electrically connected to the negative electrode current collector 21. FIG. 3 is a view of the all-solid-state rechargeable battery according to the present embodiment from the stack direction (e.g., thickness direction or in a plan view), and FIG. 2 is a cross-sectional view of the all-solid-state rechargeable battery taken along line A-A in FIG. 3.

The positive electrode current collecting unit 111 may be, for example, a thin type or kind formed of the same material as that of the positive electrode current collector 11. The positive electrode current collecting unit 111 may be formed integrally with the positive electrode current collector 11 to extend laterally from the positive electrode current collector 11. In each drawing, an imaginary line is described between the positive electrode current collector 11 and the positive electrode current collecting unit 111. In some embodiments, in the present disclosure, lateral refers to, for example, a direction from the outer periphery of the positive electrode current collector to the outside along the surface thereof, and for example, indicates a direction perpendicular or normal to the stack direction of each layer constituting the all-solid-state rechargeable battery.

In the present embodiment, the positive electrode current collecting unit 111 electrically connected to the positive electrode current collector 11 may be configured to protrude from the positive electrode current collector 11 toward the inside of the insulating layer 13. For convenience of explanation, in each drawing, a direction in which the positive electrode current collecting unit 111 protrudes is referred to as a protrusion direction, and a direction perpendicular to the protrusion direction is referred to as a width direction in the present plan view when each layer constituting the all-solid-state rechargeable battery 1 is viewed from the stack direction.

The negative electrode current collecting unit 211 electrically connected to the negative electrode current collector 21 may be, for example, a thin type or kind formed of the same material as that of the negative electrode current collector 21. The negative electrode current collecting unit 211 may be integrally formed with the negative electrode current collector 21 to extend from the negative electrode current collector 21. In FIG. 3, an imaginary line is described between the negative electrode current collector 21 and the negative electrode current collecting unit 211. In some embodiments, the positive electrode current collecting unit 111 and the negative electrode current collecting unit 211 may protrude substantially parallel to and at the same time (concurrently) at substantially the same length in the protrusion direction, but protrusion directions and protrusion lengths thereof may be the same as or different from each other.

In contrast, the thicknesses of the positive electrode current collecting unit 111 and the negative electrode current collecting unit 211 may be appropriately (suitably) changed depending on the thickness of the positive electrode current collector 11 or the negative electrode current collector 21 that are integrally formed, but may be, for example, equal to or greater than 1 µm and equal to or less than 50 µm or less, or equal to or greater than 5 µm and equal to or less than 30 µm.

1-5. Insulating Layer

The insulating layer 13 may be, for example, disposed in close contact with the side end surface (S) of the positive electrode active material layer 12 so as to cover the entire side end surface S of the positive electrode active material layer 12 of the positive electrode layer 10, which is a first electrode layer in the present embodiment. The insulating layer 13 may be formed utilizing an insulating layer material 13A, which is a material that does not pass electricity, and has a volume resistivity equal to or greater than $10^{12}$ Ω/cm. Examples of a raw material constituting the insulating layer material 13A may include a resin film containing resin, such as polypropylene, polyethylene, or copolymer thereof, etc. Examples of the resin may include, in addition to polyolefin-based resin materials described above, polyvinyl chloride (PVC) vinyl resin, polyacetal resin, polymethyl methacrylate (PMMA) acrylic resin, polycarbonate (PC), polyamide resin, polyurethane resin, polytetrafluoroethylene (PTFE) fluorine resin, a composite resin of these listed, etc.

Such a resin film may be adhered to the positive electrode layer 10, for example, according to pressure formation such as isostatic press, to make it difficult to peel off and separate. Also, as long as the insulating layer material 13A blends and mixes these resin with an insulating filler, etc., it is still good (suitable for its intended purpose). The insulating layer material 13A contains an insulating filler, and thus, the adhesiveness between the insulating layer materials 13A improves, and when the insulating layer 13 is formed or utilized, the strength of the insulating layer 13 may be improved by the insulating layer material 13A. Also, when the insulating layer material 13A contains the insulating filler together with resin, fine unevenness may be formed by blending and mixing the insulating filler on the surface of the insulating layer 13. According to the unevenness shape of the surface of the insulating layer 13, when the solid electrolyte layer 30 is stacked, the solid electrolyte layer 30 may make it difficult to peel off and separate from the insulating layer 13. As the insulating filler, articles of one or more suitable shapes such as particle, fiber, needle, or plate type or kind article may be utilized. Among these, a fiber-type or kind or non-woven fabric-type or kind insulating filler which provides an especially beneficial effect (result) may be utilized.

As the insulating filler, from a viewpoint of suppressing a cost increase, for example, one or more types (kinds) of materials selected from the group including (e.g., consisting of) fibrous resin, resin nonwoven fabric, alumina, magnesium oxide, silica, boehmite, barium titanate, barium carbonate, yttrium oxide, and manganese oxide may be utilized.

The thickness of the insulating layer 13 in a state completed as a battery is not limited, but for example, may be equal to or greater than 20 μm and equal to or less than 1000 μm, or equal to or greater than 50 μm and equal to or less than 500 μm, or equal to or greater than 100 μm and equal to or less than 300 μm. The preferred thickness may vary depending on the thickness of the positive electrode layer 10, and the thickness of the insulating layer 13 may be suitable for an article having a thickness close to the thickness of the positive electrode layer 10.

As in the present embodiment, when the positive electrode active material layer 12 is formed on both surfaces of the positive electrode current collector 11, the insulating layer 13 is also provided in two layers so as to insert the positive electrode current collector 11 and the positive electrode current collecting unit 111 into both sides thereof in substantially the same manner as the positive electrode active material layer 12. As such, the total thickness of the two insulating layers 13 into which the positive electrode current collector 11 and the positive electrode current collecting unit 111 are inserted may be approximately or substantially the same as the total thickness of the two positive electrode active material layers 12 formed on both surfaces of the positive electrode current collector 11.

1-6. Conductive Unit

In the all-solid-state rechargeable battery 1 according to the present embodiment, as shown in FIG. 2 or FIG. 3, the insulating layer 13 includes two conductive units (a positive electrode conductive unit 141 and a negative electrode conductive unit 142) electrically connecting the above-described positive electrode current collecting unit 111 and negative electrode current collecting unit 211 to external wirings, respectively.

The positive electrode conductive unit 141 (also referred to as a first conductive unit because the positive electrode layer 10 is a first electrode layer) electrically connects the positive electrode current collecting unit 111 to the external wiring, and the negative electrode conductive unit 142 (also referred to as a second conductive unit because the negative electrode layer 20 is a second electrode layer) electrically connects the negative electrode current collecting unit 211 to the external wiring.

These conductive units 141 and 142 are provided at positions where they do not directly electrically conduct with the positive electrode layer 10 and the negative electrode layer 20 respectively so as to penetrate the insulating layer 13 in a thickness direction. Also, the positive electrode conductive unit 141 and the negative electrode conductive unit 142 are formed at positions where they do not directly electrically conduct with each other. The conductive units 141 and 142 are formed by, for example, a sheet-shaped conductive member made of a material having conductivity.

The thickness of the conductive units 141 and 142 may be, for example, equal to or greater than 30% and equal to or less than 200%, or equal to or greater than 50% and equal to or less than 150%, or equal to or greater than 80% and equal to or less than 120% with respect to the thickness of a part other than the conductive units 141 and 142 of the insulating layer 13 so that the positive electrode current collector 111 or the negative electrode current collector 211 may be easily contacted.

To sufficiently exhibit the performance of the all-solid-state rechargeable battery 1, the material for forming the conductive units 141 and 142 may have an electrical conductivity equal to or greater than 106 S/m among materials possessing the conductivity. The material for forming these conductive units 141 and 142 may be, for example, a conductive material having electrochemical resistance to reduction or oxidation, and may be made of, for example, a composite containing one type or kind or two or more types (kinds) of materials selected from the group including (e.g., consisting of) metal, alloy, metal powder, carbon material, and electronically conductive polymer, or a composite containing any of these and resin. Examples of the metal may include aluminum, nickel, copper, stainless steel (SUS), etc. The positive electrode conductive unit 141 and the negative electrode conductive unit 142 described above may be made of the same material or may be made of different materials. The positive electrode conductive unit 141 may be, for example, aluminum or SUS, and the negative electrode conductive unit 142 may be, for example, nickel, copper or SUS. In some embodiments, the thicknesses of the positive electrode conductive unit 141 and the negative electrode conductive unit 142 may be the same as or different from each other.

For example, when the all-solid-state rechargeable battery 1 is utilized, the positive electrode current collector 11 may connect the positive electrode current collecting unit 111 mounted or extended at one end of the positive electrode current collector 11 and the positive electrode conductive unit 141 to an external wiring with a terminal (collection tab) mounted on the positive electrode conductive unit 141, etc. interposed therebetween.

Similarly, when the all-solid-state rechargeable battery 1 is utilized, the negative electrode current collector 21 may connect the negative electrode current collecting unit 211 mounted or extended at one end of the negative electrode current collector 21 and the negative electrode conductive unit 142 to an external wiring with a terminal (collection tab) mounted on the negative electrode conductive unit 142, etc. interposed therebetween.

2. Manufacturing Method of all-Solid-State Rechargeable Battery

An example of a method and order for manufacturing the all-solid-state rechargeable battery 1 according to the present embodiment will be described with reference to FIGS. 4 to 8.

Figure 4:
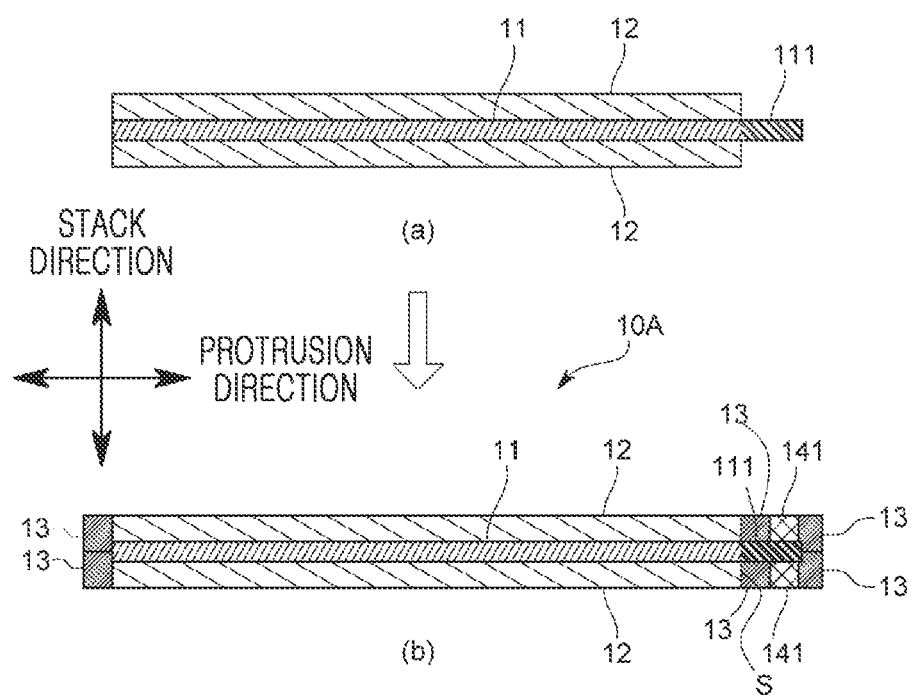
FIG. 4 is a schematic diagram illustrating a method of manufacturing the all-solid-state rechargeable battery according to an embodiment.
Figure 7:
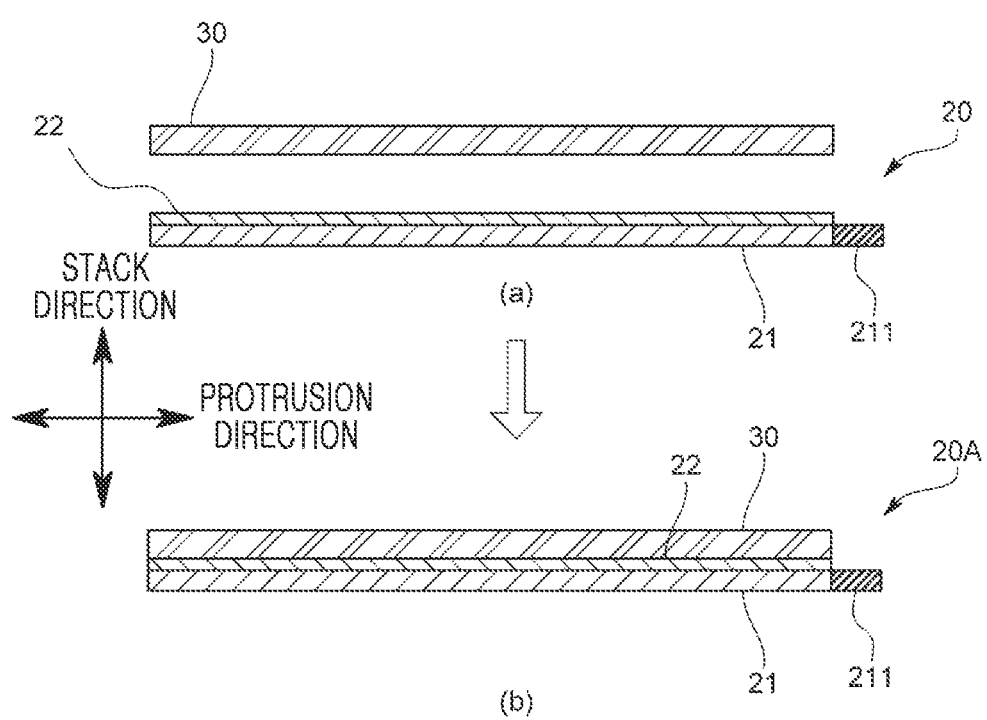
FIG. 7 is a schematic diagram showing a method of manufacturing the all-solid-state rechargeable battery according to an embodiment; (a) initial; and (b) final.
Figure 8:
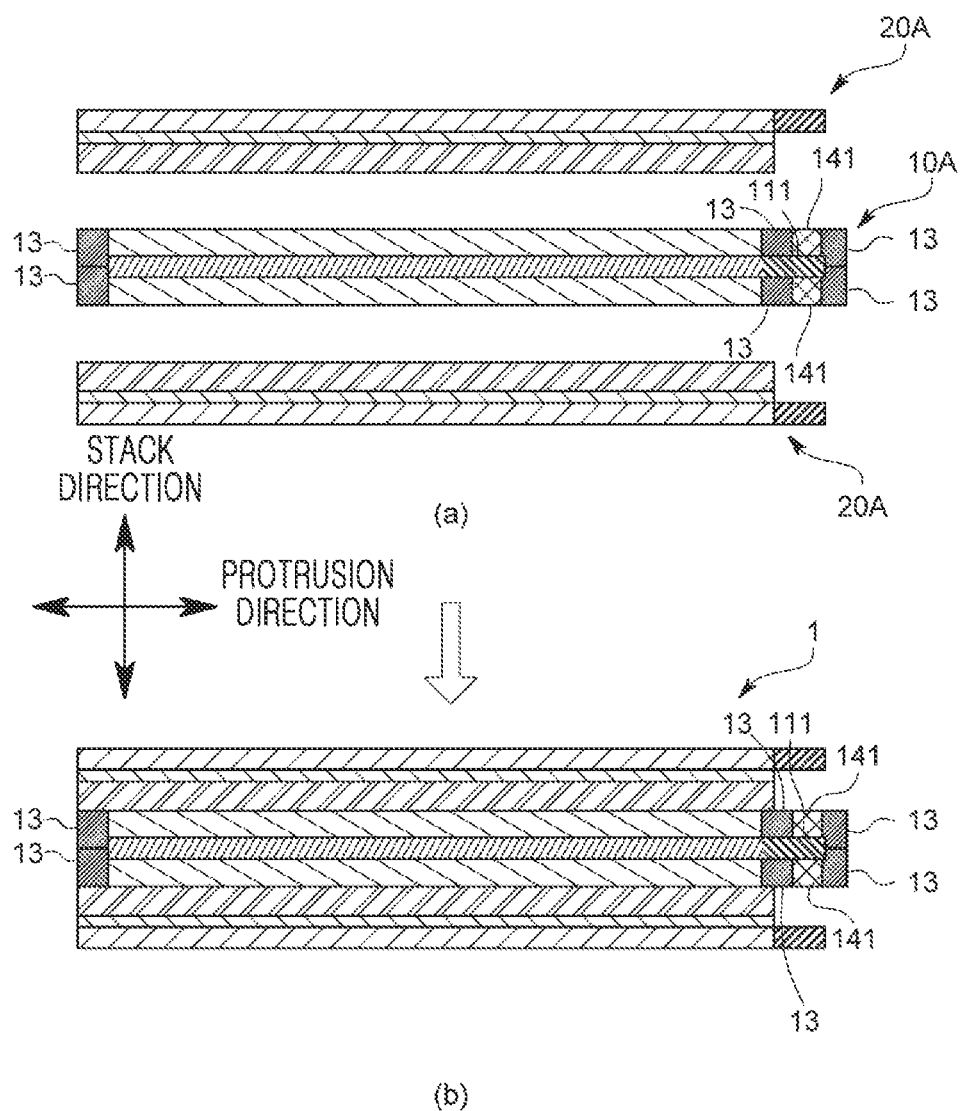
FIG. 8 is a schematic diagram showing a method of manufacturing the all-solid-state rechargeable battery according to an embodiment; (a) initial; and (b) final.

In contrast, FIGS. 4, 7 and 8 are sectional views of the all-solid-state rechargeable battery taken along the line A-A in FIG. 3 during manufacturing.

The manufacturing method of the all-solid-state rechargeable battery 1 according to the present embodiment includes the following process.

2-1. Preparation of Positive Electrode Layer

By adding the material (positive electrode active material, binder, etc.) constituting the positive electrode active material layer 12 to a non-polar solvent, a positive electrode active material layer coating solution (this positive electrode active material layer coating solution may be in the form of a slurry or a paste, and a coating solution utilized to form another layer is the same) may be prepared. Thereafter, as shown in FIG. 4(*a*), the obtained positive electrode active material layer coating solution is applied to both surfaces of the positive electrode current collector 11 and dried, and then the positive electrode current collector 11 and the applied positive electrode active material layer 12 are punched in the shape of a rectangular plate with a Thompson blade, etc. A stack structure obtained as such is called a positive electrode layer structure. A positive electrode layer insulating layer composite structure 10A shown in FIG. 4(*b*) is prepared by placing this positive electrode structure on an aluminum plate coated with a PET (polyethylene terephthalate) film, arranging two insulation layer materials 13A forming the insulation layer 13 one by one so as to insulate each positive electrode active material layer 12 around the positive electrode structure, arranging another PET film on all of these and then, laminate-packing, and applying pressure from the stack direction according to pressurization treatment (isostatic press) by isostatic pressure.

Figure 5:
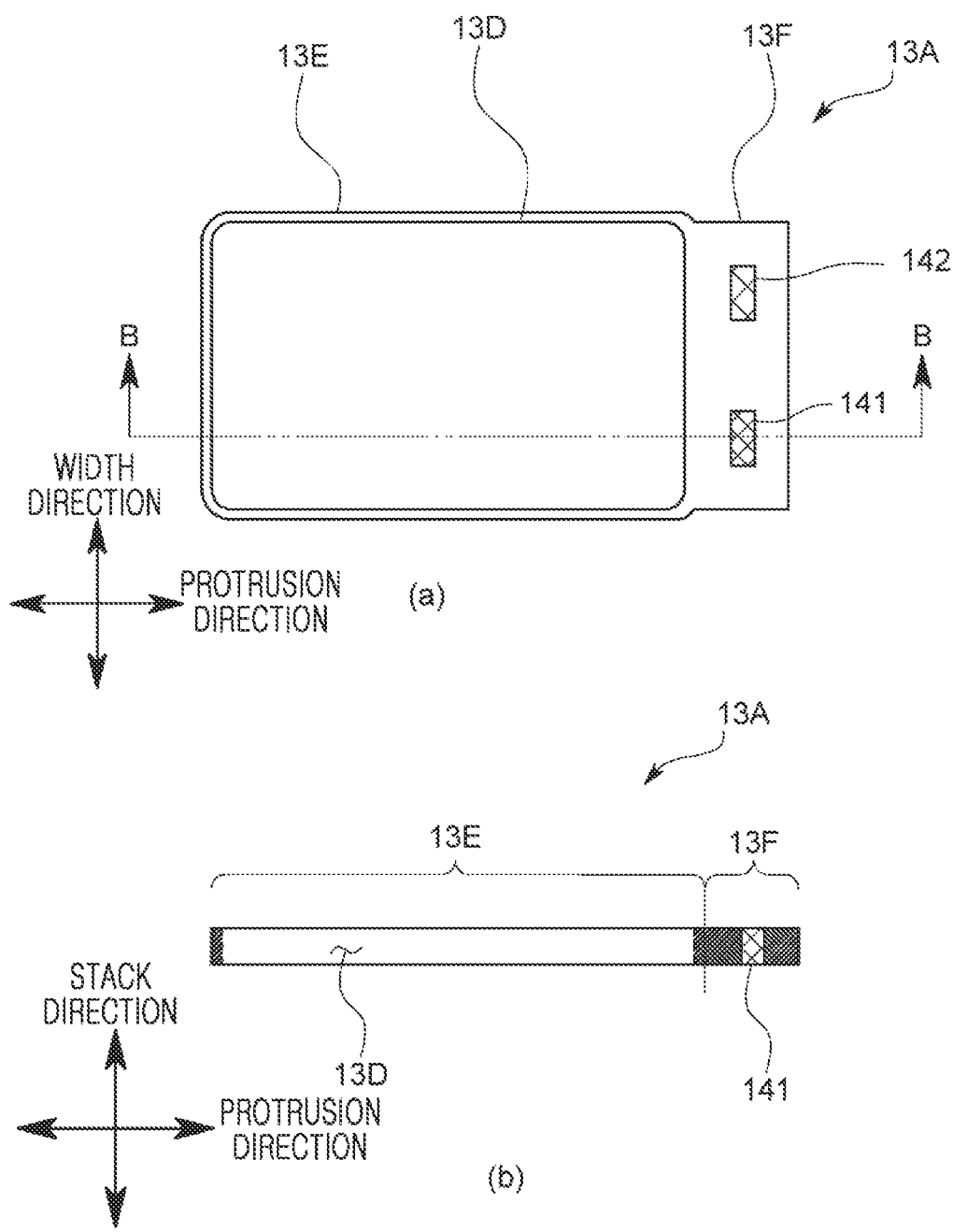
FIG. 5 is a schematic diagram showing a structure of an insulating layer material (a gasket after embedding a conductive member) utilized in the all-solid-state rechargeable battery according to an embodiment; (a) is a plan view; and (b) is a cross-sectional view.
Figure 6:
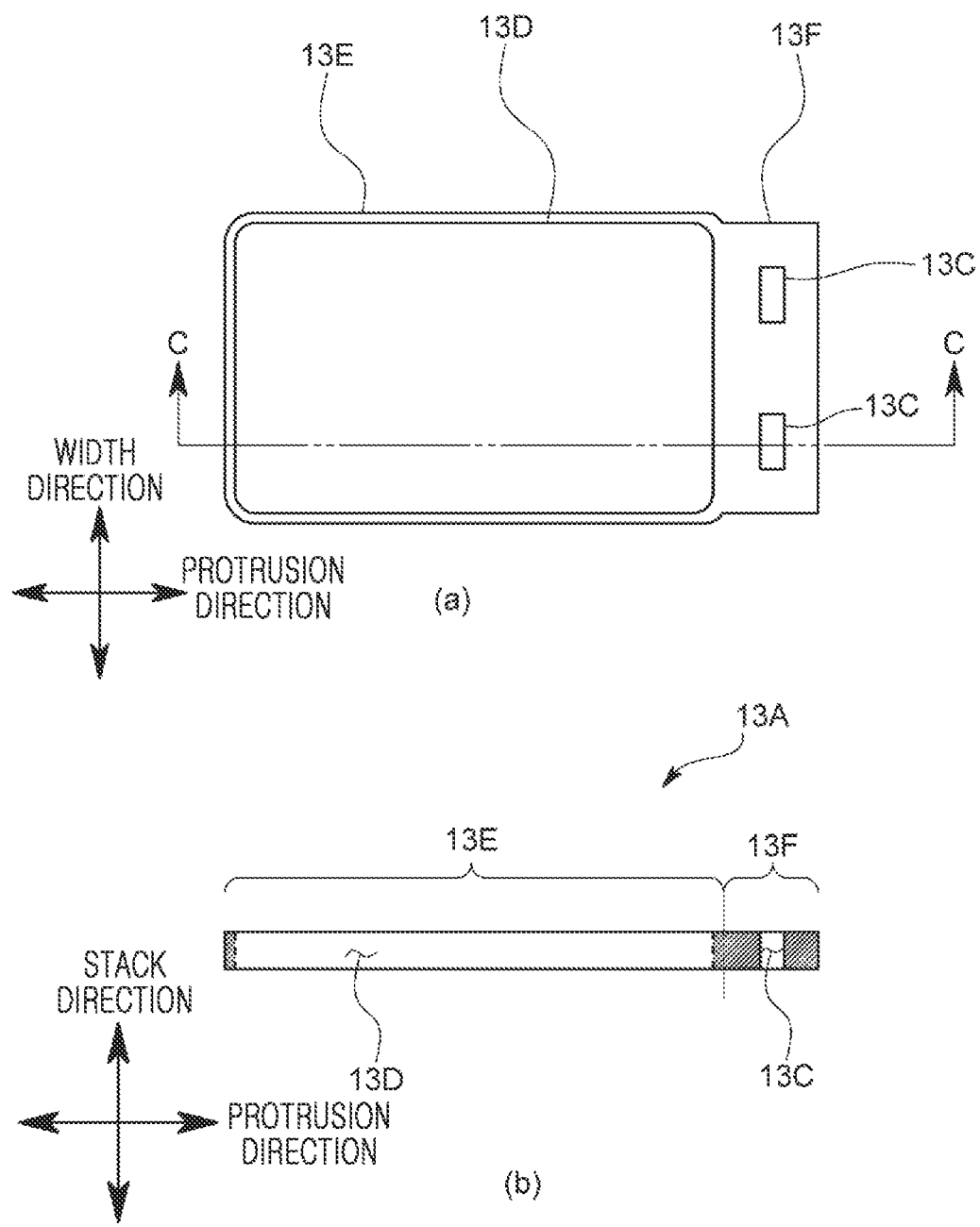
FIG. 6 is a schematic diagram showing a structure of a gasket before embedding a conductive member utilized in the all-solid-state rechargeable battery according to an embodiment; (a) is a plan view; and (b) is a cross-sectional view.

The insulating layer material 13A described above is, in the present embodiment, a gasket 13A in which the conductive member is embedded after embedding the conductive member, as shown in FIGS. 5(*a*) and 5(*b*). FIG. 5(*a*) is a schematic view of the gasket 13A viewed from the stack direction after embedding the conductive member (e.g., in a plan view), and FIG. 5(*b*) is a cross-section of the gasket 13A cut in line B-B in FIG. 5(*a*) after embedding the conductive member. The gasket 13A after embedding of the conductive member may be prepared by, for example, embedding the conductive member in the gasket 13B before embedding the conductive member formed by piercing an insulating resin film. In the gasket 13B before embedding the conductive member, for example, as shown in FIGS. 6(*a*) and 6(*b*), two embedding holes 13C for embedding conductive members forming the conductive units 141 and 142 and an accommodating hole 13D for accommodating the positive electrode active material layer 12 therein are formed. In some embodiments, FIG. 6(*a*) is a schematic view of the gasket 13A after embedding the conductive member viewed from the stack direction, and FIG. 6(*b*) is a cross-sectional view of the gasket 13A after embedding the conductive member cut in the line C-C in FIG. 6(*a*). The shape of the gasket 13B before embedding the conductive member includes a ring-shaped part 13E having an accommodating hole 13D of a size to accurately surround the positive electrode active material layer 12 from its periphery, and an extension part 13F extending laterally to the same thickness as that of the ring-shaped part 13E from the ring-shaped part 13E. In this extension part 13F, two embedding holes 13C are formed. After embedding a conductive member having the same shape or a smaller shape as that of each embedding hole 13C, and having the same thickness as that of the gasket 13B before embedding the conductive member in each of these two embedding holes 13C, the gasket 13A after embedding conductive member may be prepared by integrating the gasket 13B before embedding conductive member and the conductive member by heating and melting a resin film in the periphery of the conductive member. In some embodiments, the integration process may also be performed in a method of coating an adhesive between the embedding hole 13C and the conductive units 141 and 142 and bonding them.

2-2. Preparation of Negative Electrode Layer

By adding the material (negative electrode active material, binder, etc.) constituting the negative electrode active material layer 22 to a polar solvent or a non-polar solvent, a negative electrode active material layer coating solution is prepared. Subsequently, as shown in FIG. 7(*a*), the obtained negative electrode active material layer coating solution is applied on the negative electrode current collector 21 and dried. The negative electrode layer 20 is prepared by punching this with a Thompson blade, etc. so as to have a rectangular plate shape.

2-3. Preparation of Solid Electrolyte Layer

The solid electrolyte layer 30 may be prepared by a solid electrolyte formed from a sulfide-based solid electrolyte material. A preparation method of the solid electrolyte is as follows.

First, the starting raw material is treated by a melt quenching method or a mechanical milling method.

For example, when the melt quenching method is utilized, a sulfide-based solid electrolyte material may be prepared by mixing a set or predetermined amount of starting raw material (for example, $Li_2S$, $P_2S_5$, etc.), reacting a pellet type or kind of the starting raw material in a vacuum at a set or predetermined reaction temperature, and then quenching the pellet type or kind. In contrast, the reaction temperature of the mixture of $Li_2S$ and $P_2S_5$ is for example, 400° C. to 1000° C., or 800° C. to 900° C. Moreover, the reaction time is, for example, 0.1 hour to 12 hours, or 1 hour to 12 hours. In some embodiments, the quenching temperature of the reactant is, for example, equal to or less than 10° C., or equal to or less than 0° C., and the quenching rate is, for example, about 1° C./sec to about 10000° C./sec, or about 1° C./sec to about 1000° C./sec.

In some embodiments, when the mechanical milling method is utilized, a sulfide-based solid electrolyte material may be prepared by stirring and reacting starting raw material (for example, $Li_2S$, $P_2S_5$, etc.) utilizing a ball mill, etc. In contrast, the stirring speed and stirring time in the mechanical milling method are not limited, but the faster the stirring speed, the faster the preparation rate of the sulfide-based solid electrolyte material, and the longer the stirring time, the higher the conversion rate of the raw material to the sulfide-based solid electrolyte material.

Thereafter, a particulate solid electrolyte may be prepared by heat-treating the mixed raw material obtained by the melt quenching method or the mechanical milling method at a set or predetermined temperature and then pulverizing the mixed raw material. When the solid electrolyte has a glass transition point, the solid electrolyte may change from amorphous to crystalline by heat treatment.

A solid electrolyte layer coating solution containing the solid electrolyte obtained by the above method and other additives such as a binder, etc. and a dispersion medium is prepared. As the dispersion medium, general-purpose non-polar solvents, such as xylene and diethylbenzene, may be utilized. In some embodiments, a polar solvent having relatively insufficient reactivity (suitable reactivity) with the solid electrolyte may be utilized. The concentration of the solid electrolyte and other additives may be appropriately adjusted (suitably adjusted) according to the composition of the solid electrolyte layer 30 to be formed, the viscosity of the liquid composition, etc.

The above-described liquid composition of the solid electrolyte is applied on a PET film having a release treated surface with a blade, dried, and then a solid electrolyte sheet in which the solid electrolyte layer 30 is formed on the PET film is prepared.

2-4. Stack Process

As shown in FIG. 7(*a*), solid electrolyte sheets punched so as to have the same shape or a larger shape as that of the negative electrode layer 20 are stacked on one side of the negative electrode layer 20 prepared as described above, and isostatically pressed, and thus, as shown in FIG. 7(*b*), the negative electrode layer 20 and the solid electrolyte layer 30 are in close contact and integrated. When the solid electrolyte layer 30 has a larger shape than that of the negative electrode layer 20, a part of the solid electrolyte layer 30 that protrudes outward when stacked on the negative electrode layer 20 may be removed. This stack structure is called an electrolyte negative electrode structure 20A.

Then, as shown in FIG. 8(*a*), the positive electrode layer insulating layer composite structure 10A described above is stacked narrowly to two electrolyte negative electrode structures 20A on both surfaces. Then, the all-solid-state rechargeable battery 1 as shown in FIG. 8(*b*) is prepared by stacking the electrolyte negative electrode structure 20A so that the solid electrolyte layer 30 of the electrolyte negative electrode structure 20A is in contact with each of both surfaces of the positive electrode layer 10, laminate-packing all of these, and applying isostatic pressure.

In the present embodiment, in the stack process described above, as shown in FIG. 3, one side of an outer edge 1E of the insulating layer 13 extends to the outside of the positive electrode current collecting unit 111 and the negative electrode current collecting unit 211 in a protrusion direction of the positive electrode current collector 111 and the negative electrode current collector 211. In the present embodiment, it has been described that one side of the outer edge 1E of the insulating layer 13 in the protrusion direction is entirely provided at the same position, but the outer edge 1E of the insulating layer 13 may have a shape extending in the protrusion direction only at a part where the positive electrode current collecting unit 111 and the negative electrode current collecting unit 211 protrude.

As described above, although the outer edge 1E of the insulating layer 13 protrudes only from the part where the positive electrode current collecting unit 111 and the negative electrode current collecting unit 211 protrude, the entire outer edge 1E of the protrusion direction is arranged outside an outer edge 2E of the negative electrode layer 20. In some embodiments, the outer edge 2E of the negative electrode layer 20 is stacked so as to be positioned on the insulating layer 13, because the negative electrode layer 20 may press the positive electrode layer 10 by external pressure, sometimes resulting in deformation. Therefore, a short circuit due to physical contact between the positive electrode layer 10 and the negative electrode layer 20 may be suppressed or reduced.

As shown in FIG. 3, the outer edge 1E of the insulating layer 13 indicates the outermost edge (outer edge) of a side end surface of the insulating layer 13 in a direction perpendicular to the stack direction. In some embodiments, the outer edge 2E of the negative electrode layer 20 indicates the outermost edge (outer edge) of a side end surface of the negative electrode layer 20 in the direction perpendicular to the stack direction, and in the present embodiment, for example, is the outermost edge of a side end surfaces of the negative electrode current collector 21 or the negative electrode active material layer 22 in the direction perpendicular or normal to the stack direction.

As such, the thickness of the insulating layer 13 of the extension part 13F extending to support the positive electrode current collecting unit 111 and the negative current collecting unit 211 is the same as the thickness of the insulating layer 13 of the ring-shaped part 13E described above.

As configured as such, it is possible to support and protect the entire surface of the positive electrode current collecting unit 111 and the negative current collecting unit 211 without a step difference as much as possible from at least one side of the positive electrode current collecting unit 111 and the negative current collecting unit 211 by the insulating layer 13, during isostatic press which will be described later.

2-5. Isostatic Press

Hereinafter, pressurization treatment (pressing process) by the above isostatic press is described.

The isostatic press is performed by arranging, for example, a support plate such as a SUS plate on at least one side of the stack structure.

According to this isotropic press, pressurization treatment may be performed on the positive electrode layer insulating layer composite structure 10A, the electrolyte negative electrode structure 20A, or each stack structure forming the all-solid-state rechargeable battery 1 from a stack direction thereof.

A pressure medium of isostatic press may include liquid such as water or oil, powder, etc. It is more preferable to utilize liquid as the pressure medium.

The pressure in isotropic press is not limited, and, for example, may be 10 to 1000 Mpa, or 100 to 500 Mpa. In addition, pressurization time is not limited, and, for example, may be 1 to 120 minutes, or 5 to 30 minutes. Also, the temperature of the pressure medium at the time of pressurization is also not limited, and, for example, may be 20 to 200° C., or 50 to 100° C.

In some embodiments, at the time of isostatic press, it is preferable that the stack structure constituting the all-solid-state rechargeable battery 1 is laminated with a resin film, etc. along with a support plate, and is blocked (or substantially blocked) by an external atmosphere.

Compared with other press methods such as roll press, etc., isostatic press is advantageous from the point of view of suppressing crack(s) in each layer constituting the all-solid-state rechargeable battery 1, preventing or reducing warpage of the all-solid-state rechargeable battery 1, and enabling a high-pressure press that does not result in an increase in an electrode area.

Figure 9:
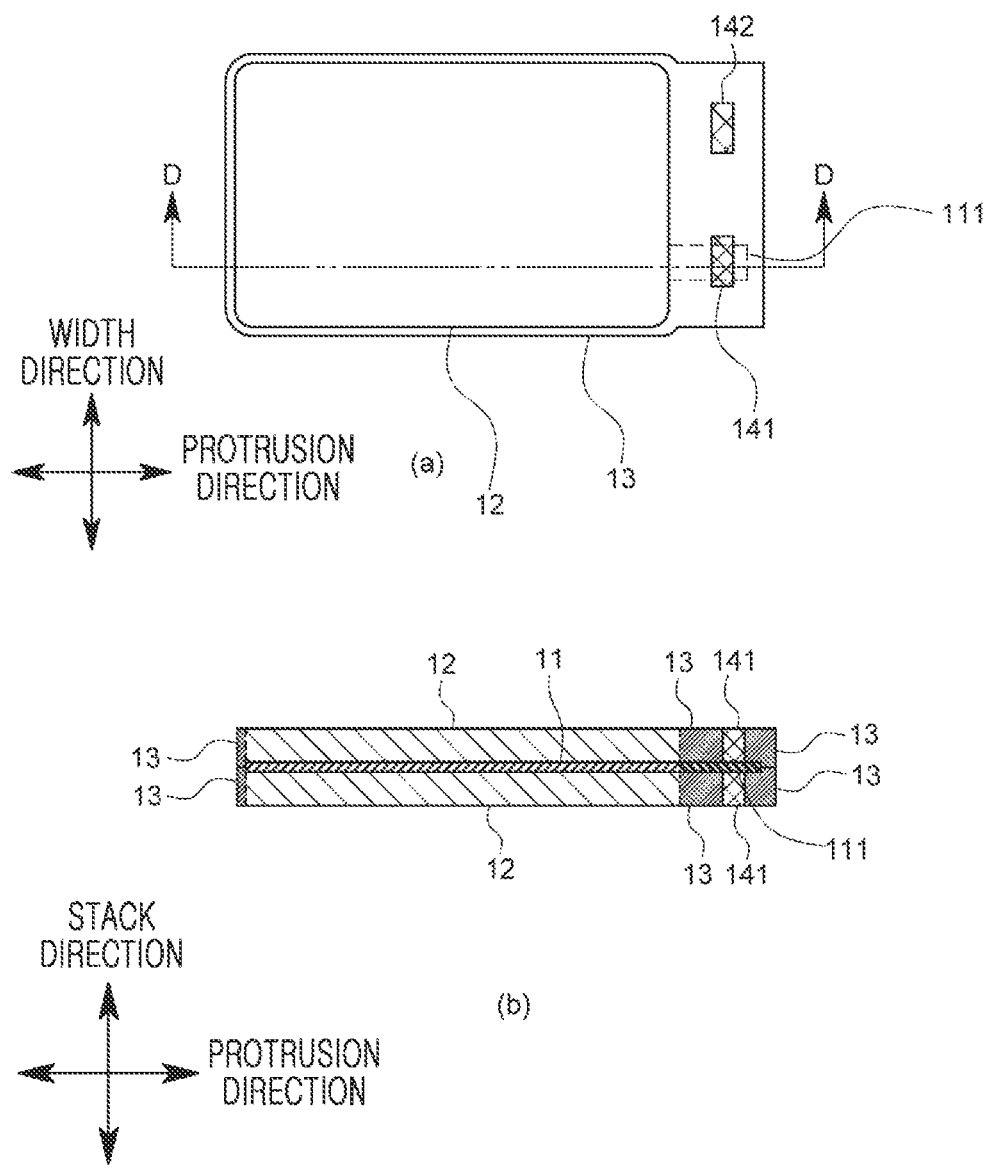
FIG. 9 is a view of a positive electrode layer and an insulating layer of the all-solid-state rechargeable battery according to an embodiment; (a) width direction; and (b) stack direction.

In the present embodiment, as shown in FIG. 5, by preparing for two gaskets 13A after embedding the conductive member, arranging the two gaskets 13A after embedding the conductive member to cover side peripheral surfaces of the two positive electrode active material layers 12, and then performing pressure treatment by isostatic pressure, as shown in FIG. 9, the entire positive electrode current collecting unit 111 is covered and supported on both surfaces by the insulating layer 13 so as to be inserted with and supported from the stack direction of each layer. Then, the gasket 13A after embedding the conductive member is disposed so that the positive electrode conductive unit 141 and the negative electrode conductive unit 142 formed in the insulating layer 13 are in contact with the positive electrode current collecting unit 111 and the negative electrode current collecting unit 211, respectively. In some embodiments, in FIGS. 1, 2, and 8, it appears that there is a gap between the negative electrode current collecting unit 211 and the insulating layer 13, but at the time of being stacked, there is practically no gap therebetween. When pressurizing, the entire negative electrode current collecting unit 211 is supported by the insulating layer 13 from one side thereof by being pressed against the insulating layer 13, and the positive electrode current collecting unit 111 and the negative electrode current collecting unit 211 are pressed and fixed to the positive electrode conductive unit 141 and the negative electrode conductive unit 142, respectively. FIG. 9(a) is a schematic view of the gasket 13A after embedding the conductive member and the positive electrode layer 10 viewed from the stack direction, and FIG. 9(b) is a cross-sectional view of the gasket 13A after embedding the conductive member and the positive electrode layer 10 cut along line D-D of FIG. 9(a).

As described above, the all-solid-state rechargeable battery 1 is formed by applying isotropic pressure in a state in which the positive electrode current collecting unit 111 and the negative electrode current collecting unit 211 are supported from at least one side by an insulating layer, and compressing all the layers constituting the all-solid-state rechargeable battery 1.

3. Effects of all-Solid Rechargeable Battery According to Present Embodiment

The all-solid-state rechargeable battery 1 may be mostly occupied with a powder material and thus each layer is formed, and, when manufactured without pressure treatment by isostatic pressure, etc., for example, a path in which the positive electrode and the negative electrode are connected by a void in the solid electrolyte layer is generated, and a short circuit may easily occur. Further, there is a fear that groove and unevenness may be formed on the surface of each layer due to a slight gap between powder and powder, and sufficient electrical conductivity or ionic conductivity may not be obtained. According to the manufacturing method of the all-solid-state rechargeable battery 1 according to the present embodiment, the battery is formed by isostatic press, and thus void and surface unevenness in the electrode of the all-solid-state rechargeable battery 1 or inside the solid electrolyte may be suppressed or reduced to be as little as possible. As a result, in the stacked all-solid-state rechargeable battery stacked with a plurality of these all-solid-state rechargeable batteries 1, it is possible to avoid the formation of a conductive path occurring in the all-solid-state rechargeable battery 1 or the concentration of current only on a protrusion.

As described above, it is possible to avoid the concentration of current only on a part of the surface of the all-solid-state rechargeable battery 1, and when conductivity and ionic conductivity may be sufficiently secured, the entirety of the positive electrode layer 10 and the negative electrode layer 20 contributes charging/discharging, and thus, it is possible to improve the charging/discharging capacity of the stacked all-solid-state rechargeable battery.

In some embodiments, the positive electrode layer 10 and the negative electrode layer 20 substantially uniformly contribute to charging/discharging over the whole, and thus, it is possible to suppress or reduce, for example, metal lithium, etc. from concentrating and precipitating only in some places. As a result, a short circuit by precipitation of metal lithium may also be suppressed or reduced.

Also, during the isostatic press, the entire surfaces of the positive electrode current collecting unit 111 and the negative electrode current collecting unit 211 are supported from both surfaces or one surface by the insulating layer 13, and thus it is possible to suppress or reduce the occurrence of cracks in the positive electrode current collecting unit 111 and the negative electrode current collecting unit 211 or cutting of the positive electrode current collecting unit 111 and the negative electrode current collecting unit 211.

As a result, without inconveniently reconnecting the positive electrode current collecting unit 111 or the negative electrode current collecting unit 211 to the positive current collector 11 or the negative current collector 21, the highly reliable all-solid-state rechargeable battery 1 and stacked all-solid-state rechargeable battery may be manufactured.

In some embodiments, the insulating layer 13 is provided with two conductive units for electrically connecting each of the positive electrode current collecting unit 111 and the negative electrode current collecting unit 211 to an external wiring, etc. so as to penetrate the insulating layer 13, and thus even in a state in which the positive electrode current collecting unit 111 is covered from both surfaces by the insulating layer 13, it is possible to utilize the all-solid-state rechargeable battery as it is without the effort of cutting off a part of the insulating layer 13.

4. Manufacturing Method of Stacked all-Solid-State Rechargeable Battery

By stacking a plurality of all-solid-state rechargeable batteries 1 manufactured as described above, for example, even when three or four or more all-solid-state rechargeable batteries 1 are stacked, the stacked all-solid-state rechargeable battery in which a cycle characteristic is sufficiently maintained and a short circuit is unlikely to occur may be manufactured.

When the all-solid-state rechargeable batteries 1 are stacked, when positions of the conductive units 141 and 142 provided on the insulating layer 13 with respect to the plurality of all-solid-state rechargeable batteries 1 are identical to the positive electrode conductive units 141 and the negative electrode conductive units 142 in the stack direction, respectively, only by overlapping and pressing or welding these, the positive electrode conductive units 141 and the negative electrode conductive units 142 provided in the all-solid-state rechargeable battery 1 may conduct each other, respectively, and thus the inconvenience of cutting off a part of the insulating layer covered with the current collecting unit may not be provided because one all-solid-state rechargeable battery 1 is electrically connected to one of these (i.e., conductive units) by wiring.

5. Charging/Discharging of all-Solid-State Rechargeable Battery According to Present Embodiment Charging/discharging of the all-solid-state rechargeable battery 1 according to the present embodiment will be described in more detail below.

In the all-solid-state rechargeable battery 1 according to the present embodiment, at the initial stage of charging, the negative electrode active material forming an alloy or compound with lithium in the negative electrode active material layer 22 forms an alloy or compound with lithium ions, so that lithium is occluded in the negative electrode active material layer 22. Thereafter, after exceeding the charging capacity exhibited by the negative electrode active material layer 22, metallic lithium is educed on the surface in one direction or both sides of the negative electrode active material layer 22 and a metallic lithium layer is formed. Because the metallic lithium is formed by diffusing an interposed negative electrode active material capable of forming an alloy or compound, the metallic lithium is primarily formed substantially uniformly between the negative electrode active material layer 22 and the negative electrode current collector 21 rather than on resin (on dendrite). During discharging, the metallic lithium is ionized in the negative electrode active material layer 22 and the metallic lithium layer and moves to the positive electrode active material layer 12. Therefore, as a result, the metallic lithium itself may be utilized as a negative electrode active material, and thus the energy density is improved (increased).

In some embodiments, when the metallic lithium layer is formed between the negative electrode active material layer 22 and the negative electrode current collector 21, for example, inside the negative electrode layer 20, the negative electrode active material layer 22 covers the metallic lithium layer. Accordingly, the negative electrode active material layer 22 functions as a protective layer of the metallic lithium layer. Accordingly, the short circuit and the capacity deterioration of the all-solid-state rechargeable battery 1 are suppressed or reduced, and furthermore, the characteristics of the all-solid-state rechargeable battery 1 are improved.

In the negative electrode active material layer 22, an example of a method of enabling eduction of metallic lithium may include a method of making the charging capacity of the positive electrode active material layer 12 larger than the charging capacity of the negative electrode active material layer 22. For example, the comparison (capacity ratio) between the charging capacity of the positive electrode active material layer 12 and the charging capacity of the negative electrode active material layer 22 satisfies the requirements of Equation 1.

$$0.002 < b/a < 0.5 \quad \text{Equation 1}$$

a: charging capacity (mAh) of the positive electrode active material layer 12 b: charging capacity (mAh) of the negative electrode active material layer 22

When the capacity ratio expressed by Equation 1 is greater than 0.002, the negative electrode active material layer 22 may sufficiently mediate the eduction of metallic lithium from lithium ions, regardless of the configuration of the negative electrode active material layer 22, and thus it is easy to appropriately (suitably) form the metallic lithium layer. In some embodiments, when the metallic lithium layer is formed between the negative electrode active material layer 22 and the negative electrode current collector 21, it is preferable in order to make it possible for the negative electrode active material layer 22 to sufficiently function as a protective layer. For this reason, the capacity ratio may be, for example, equal to or greater than 0.01, or equal to or greater than 0.03.

In some embodiments, because the negative electrode active material layer 22 does not store most of the lithium when the capacity ratio is less than 0.5 and during charging, it is easy to substantially uniformly form the metallic lithium layer irrespective of the configuration of the negative electrode active material layer 22. The capacity ratio may be, for example, equal to or less than 0.2, or equal to or less than 0.1.

The capacity ratio may be, for example, greater than 0.01. This is because, when the capacity ratio is equal to or less than 0.01, there is a risk that the characteristics of the all-solid-state rechargeable battery 1 deteriorate. The reason for this is that the negative electrode active material layer 22 does not sufficiently (suitable) function as a protective layer. For example, when the thickness of the negative electrode active material layer 22 is very thin, the capacity ratio may be equal to or less than 0.01. In this embodiment, there is a possibility that the negative electrode active material layer 22 collapses due to repeated charging/discharging, and dendrites are educed and grown. As a result, there is a risk that the characteristics of the all-solid-state rechargeable battery 1 may deteriorate. Moreover, the capacity ratio may be smaller than 0.5. This is because, when the capacity ratio is equal to or greater than 0.5, the amount of lithium educed in the negative electrode layer 20 may decrease, and the battery capacity may decrease. For the same reason, it is considered more preferable that the capacity ratio is less than 0.25. Further, because the capacity ratio is less than 0.25, the output characteristics of the battery may also be further improved.

The charging capacity of the positive electrode active material layer 12 may be obtained by multiplying a specific charge capacity (mAh/g) of the positive electrode active material by the mass of the positive electrode active material in the positive electrode active material layer 12. When a plurality of positive electrode active materials are utilized, a value of a specific charge capacity×mass may be calculated for each positive electrode active material, and the sum of these values may be utilized as the charging capacity of the positive electrode active material layer 12. The charging capacity of the negative electrode active material layer 22 may also be calculated utilizing the same method. For example, the charging capacity of the negative electrode active material layer 22 may be obtained by multiplying the specific charge capacity (mAh/g) of the negative electrode active material by the mass of the negative electrode active material in the negative electrode active material layer 22. When a plurality of kinds of negative electrode active materials are utilized, a value of specific charge capacity×mass is calculated for each negative electrode active material, the sum of these values may be utilized as the charging capacity of the negative electrode active material layer 22. Here, the charge specific capacity of the positive electrode active material and the negative electrode active material is a capacity estimated utilizing an all-solid half cell utilizing lithium metal for the opposite electrode. In fact, the charging capacities of the positive electrode active material layer 12 and the negative electrode active material layer 22 are directly measured by utilizing an all-solid half cell.

A specific method of directly measuring the charging capacity may include the following. First, the charging capacity of the positive electrode active material layer 12 is measured by producing an all-solid-state half cell utilizing the positive electrode active material layer 12 as a working electrode and Li as an opposite electrode, and performing CC-CV charging from OCV (open voltage) to the upper limit charging voltage.

The upper limit charging voltage may be determined by the standard of JIS C8712:2015, and may indicate 4.25V for the positive electrode active material layer 12 utilizing a lithium cobalt acid-based positive electrode active material, and a voltage required by applying the provisions of A. 3.2.3 (safety requirements when other upper limit charging voltage is applied) of JIS C8712:2015 for the positive electrode active material layer 12 utilizing other suitable positive electrode active materials. The charging capacity of the negative electrode active material layer 22 may be measured by producing an all-solid-state half cell utilizing the negative electrode active material layer 22 as a working electrode and Li as an opposite electrode, and performing CC-CV charging from OCV (open voltage) to 0.01 V.

By dividing the charging capacity measured as such by the mass of each active material, the charging specific capacity is calculated. The charging capacity of the positive electrode active material layer 12 may be an initial charging capacity measured during charging of a first cycle.

In an embodiment of the present disclosure, the charging capacity of the positive active material layer 12 is set to be excessive with respect to the charging capacity of the negative active material layer 22. As will be described in more detail, in the present embodiment, the all-solid-state rechargeable battery 1 is charged beyond the charging capacity of the negative electrode active material layer 22. For example, the negative electrode active material layer 22 is overcharged. At the initial stage of charging, lithium is occluded in the negative electrode active material layer 22. For example, the negative electrode active material forms an alloy or compound with lithium ions that have migrated from the positive electrode layer 10. When charging is performed beyond the capacity of the negative electrode active material layer 22, lithium is educed on the back side of the negative electrode active material layer 22, for example, between the negative electrode current collector 21 and the negative electrode active material layer 22, and a metallic lithium layer is formed by the lithium.

This phenomenon occurs when the negative active material is configured as a specific material, for example, a material that forms an alloy or a compound with lithium. During discharging, lithium in the negative electrode active material layer 22 and the metallic lithium layer is ionized and moves to the positive electrode layer 10. Therefore, in the all-solid-state rechargeable battery 1, metallic lithium may be utilized as a negative electrode active material. For example, when the charging capacity of the negative electrode layer 20 (the total charging capacity of the charging capacity exhibited by the negative electrode active material layer 22 and the metallic lithium layer described above) is 100%, the charging capacity equal to or greater than 80% may be exhibited by the metallic lithium layer.

In some embodiments, because the solid electrolyte layer 30 covers the above-described metallic lithium layer, the negative electrode active material layer 22 functions as a protective layer of the metallic lithium layer and at the same time (concurrently) suppresses the eduction and growth of dendrites. Accordingly, the short circuit and the capacity deterioration of the all-solid-state rechargeable battery 1 are suppressed or reduced more efficiently, and furthermore, the characteristics of the all-solid-state rechargeable battery 1 are improved.

6. Another Embodiment According to the Present Disclosure

The all-solid-state rechargeable battery according to the present disclosure is not limited to the above.

For example, the first electrode layer may be a negative electrode layer, and the second electrode layer may be a positive electrode layer.

In the above embodiment, although it has been described that the insulating layer is disposed on the side end surface of the first electrode layer, the insulating layer may also be provided on the side end surface of the second electrode layer.

The solid electrolyte layer 30 provided between the positive electrode layer and the negative electrode layer may be stacked in at least one layer, or may be stacked in two, three, four or more layers.

Figure 10:
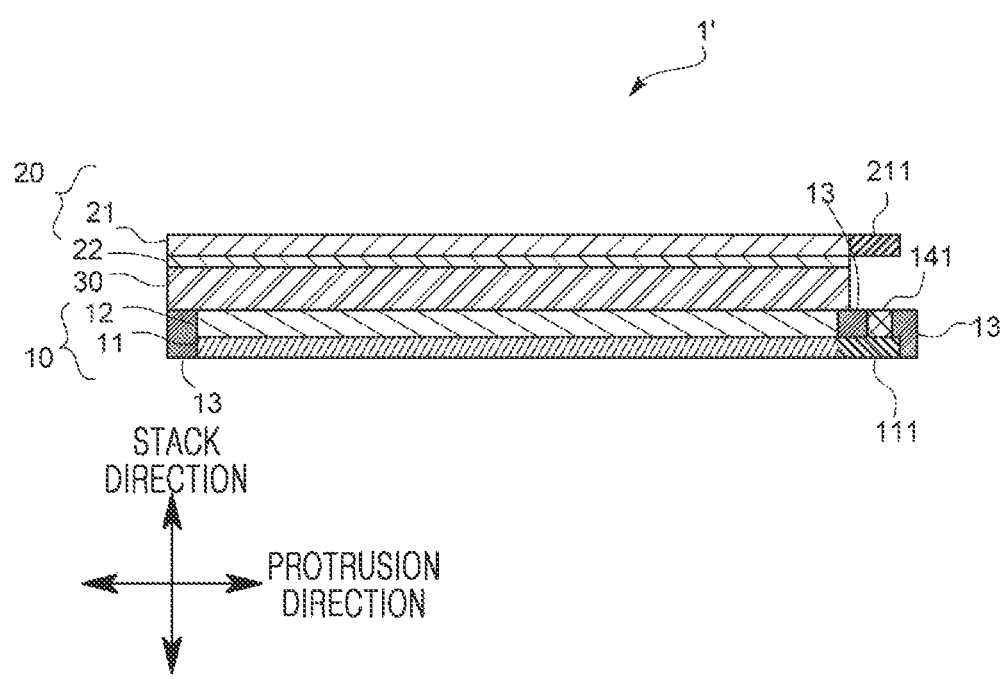
FIG. 10 is a cross-sectional view showing a schematic configuration of an all-solid-state rechargeable battery according to an embodiment.

As shown in FIG. 10, the solid electrolyte layer is stacked on only one side of the first electrode layer, so that the all-solid-state rechargeable battery may also be in the shape in which the second electrode layer is formed on the solid electrolyte layer.

The present disclosure is not limited to an all-solid-state lithium ion rechargeable battery, but may be widely applied to an all-solid-state rechargeable battery having a thin type or kind current collecting unit and formed by pressurization treatment such as isostatic press, etc.

Embodiment 1

Preparation of Positive Electrode Layer Structure $LiNi_{0.8}Co_{0.15}Al_{0.05}O_2$ (NCA) ternary powder as a positive electrode active material, $Li_2S$—$P_2S_5$ (80:20 mol %) amorphous powder as a sulfide-based solid electrolyte, and vapor-grown carbon fiber powder as a positive electrode layer conductive material (conductive auxiliary agent) were weighed in a mass % comparison of 60:35:5 and mixed utilizing a rotational revolution mixer.

Next, a dehydrated xylene solution in which styrene-butadiene rubber (SBR) as a binder was dissolved was added to this mixed powder so that the SBR was 5.0 mass % with respect to the total mass of the mixed powder, and a primary mixed solution was prepared.

A secondary solution mixture was prepared by adding an appropriate or suitable amount of dehydrated xylene for viscosity adjustment to this primary solution mixture.

In some embodiments, in order to improve the dispersibility of mixed powder, a zirconia ball having a diameter of 5 mm was put into the secondary solution mixture so that each of space, mixed powder, and zirconia ball occupy ⅓ of the total volume of a kneading vessel.

A tertiary solution mixture generated as such was put into the rotational revolution mixer, and a positive electrode active material layer coating solution was prepared by gaiters at 3000 rpm for 3 minutes.

Next, an aluminum foil current collector having a thickness of 20 μm is prepared as the positive electrode current collector 11, the positive electrode current collector 11 is mounted on a desktop screen printing machine, and the positive electrode active material layer coating solution is applied on a sheet utilizing a metal mask having a thickness of 150 μm. Thereafter, the sheet applied with the positive electrode active material layer coating solution was dried on a hot plate at 60° C. for 30 minutes, then the back side is also applied, and dried on the hot plate at 60° C. for 30 minutes, and then vacuum dried at 80° C. for 12 hours. The positive electrode active material layer 12 was formed on both surfaces of the positive electrode current collector 11 by punching this into a rectangular plate shape with a Thompson blade. The total thickness of the positive electrode current collector 11 and the positive electrode active material layer 12 after drying was about 330 μm.

The positive electrode current collector 11 and the positive electrode active material layer 12 are placed on an aluminum plate (support substrate) having a thickness of 3 mm to which a polyethylene PET film (hereinafter referred to as a release film) with a surface release treatment is attached, the two gaskets 13A after embedding a conductive member are disposed so that the ring-shaped part 13E surrounds the periphery of the positive electrode active material layer 12 and the extension part 13F inserts the positive electrode current collecting unit 111 protruding from the positive electrode current collector 11 from both surfaces, then, again covered with the release film, also covered with the metal plate (support substrate) made of steel use stainless or stainless steel (SUS) in substantially the same shape as a shape matching the positive active material layer and the ring-shaped part of the gasket 13A after embedding the conductive member, for example, a shape which does not cover the extension part of the gasket 13A after embedding the conductive member, with a thickness of 0.3 mm, and then, laminate-packed including the support substrate. By submerging in a pressurized medium and performing hydrostatic treatment (consolidation process by isostatic press) at 490 MPa, the ring-shaped part 13E of the gasket 13A after embedding the conductive member is integrated into the positive electrode current collector 11 and the positive electrode active material layer 12. Then, the positive electrode conductive unit 141 has a structure in contact with the positive electrode current collecting unit 111 formed to protrude from the positive electrode current collector 11.

The positive electrode layer insulating layer composite structure 10A is called including the positive electrode layer 10 in which the positive electrode active material layers 12 are stacked on both surfaces of the positive electrode current collector 11, and the insulating layer 13 covering a side peripheral surface different from the stack direction of these positive electrode active material layers 12.

The gasket 13A after embedding the conductive member described above was prepared as follows. The gasket 13B before embedding the conductive member in which an insulating resin film is punched from, for example, Pinnacle Die (registered trademark), and an embedding hole 13C for embedding the conductive member forming the conductive units 141 and 142 and an accommodating hole 13D for accommodating the positive electrode active material layer 12 therein are formed was prepared. The insulating resin film utilized in the present embodiment is made by Dainippon Printing Co., Ltd. containing a resin nonwoven fabric as an insulating filler. The shape of the gasket 13B before embedding the conductive member was, as shown in FIG. 6, set as a structure in which the rectangular-shaped extension part 13F which protects the current collecting units 111 and 211 extends in one direction from the ring-shaped part 13E having the accommodating hole 13D sized to accurately surround the positive electrode active material layer 12 from its periphery. In the central portion of the extended part 13F, the above-described two embedding holes 13C are independently formed at positions in contact with the positive electrode current collecting unit 111 and the negative electrode current collecting unit 211, respectively. A conductive member having the same shape as this embedding hole 13C and having the same thickness as that of the gasket 13B before embedding the conductive member is embedded, and then, the resin film around the conductive member is heated to melt the resin film, so that the gasket 13B before embedding the conductive member and the conductive member were integrated to obtain the gasket 13A after embedding the conductive member including the conductive units 141 and 142. In the present embodiment, an aluminum foil is utilized as the conductive member for forming the positive electrode conductive unit 141 in contact with the positive electrode current collecting unit 111, and a nickel foil is utilized as the conductive member for forming the negative electrode conductive unit 142 in contact with the negative electrode current collecting unit 211 in the other direction.

Preparation of Negative Electrode Layer

As the negative electrode current collector 21, a nickel foil current collector having a thickness of 10 μm was prepared. In some embodiments, as the negative electrode active material, CB1 (a nitrogen adsorption specific surface area is about 339 m$^2$/g, and a DBP oil supply amount is about 193 mL/100 g) made by Asahi Carbon, CB2 (a nitrogen adsorption specific surface area is about 52 m$^2$/g, and a DBP oil supply amount is about 193 mL/100 g) made by Asahi Carbon Corporation, and silver particles having a particle size of 60 nm were prepared. In some embodiments, as the particle diameter of this silver particle, for example, a median diameter (D50) measured utilizing a laser-type or kind particle size distribution meter may be utilized.

Next, silver particles of 1.5 g of CB1, 1.5 g of CB2, and 1 g were put in a container, and 4 g of N-methylpyrrolidone (NMP) solution including a binder (#9300 made by Kureha Corporation) of 5 mass % were added thereto. Next, the negative electrode active material layer coating solution was prepared by utilizing a mixed solution in a gaiter while gradually adding NMP of a total amount of 30 g to this mixed solution. This negative electrode active material layer coating solution was applied on a Ni foil utilizing a blade coater, and dried in the air at 80° C. for about 20 minutes, and thus the negative electrode active material layer 22 was formed. The stack structure obtained as such was vacuum-dried at 100° C. for about 12 hours and punched out in Pinnacle Die (registered trademark). By the above process, the negative electrode layer 20 was prepared.

Preparation of Solid Electrolyte Sheet

First, a solid electrolyte layer coating solution was prepared.

By adding an SBR binder dissolved in dehydrated xylene to Li$_2$S—P$_2$S$_5$ (80:20 mol %) amorphous powder as a sulfide-based solid electrolyte so as to be 1% by mass relative to the solid electrolyte, a primary mixed slurry was generated. In some embodiments, by adding appropriate or suitable amounts of dehydrated xylene and dehydrated diethylbenzene for viscosity adjustment to this primary mixed slurry, a secondary mixed slurry was generated. In some embodiments, to improve the dispersibility of the mixed powder, a zirconia ball having a diameter of 5 mm was put into the tertiary mixing slurry so that each of space, mixing powder, and the zirconia ball occupies ⅓ of the total volume of the kneading vessel. A tertiary liquid mixture prepared as such was put into a rotational revolution mixer, and stirred at 3000 rpm for 3 minutes and thus a solid electrolyte layer coating solution was prepared.

The prepared solid electrolyte layer coating solution was applied with a blade on a PET film having a release treatment on the surface, dried on a hot plate at 40° C. for 10 minutes, and then vacuum dried at 40° C. for 12 hours and thus, a solid electrolyte sheet was obtained. The thickness of the solid electrolyte layer after drying was about 65 μm. The dry solid electrolyte sheet was punched out by a Thompson blade and processed to a set or predetermined size.

Preparation of Electrolyte Negative Electrode Structure

A solid electrolyte sheet is placed on the surface of the negative electrode layer 20 so that the solid electrolyte layer 30 and the negative electrode active material layer 22 are in contact with each other, and these are mounted on an aluminum plate (support substrate) having a thickness of 3 mm to which a release film is attached, and vacuum lamination pack was performed including the support substrate. By submerging in a pressurized medium and performing hydrostatic treatment (consolidation process by isostatic press) at 30 MPa, the solid electrolyte layer on the solid electrolyte sheet was integrated with the negative electrode layer 20. This is called an electrolyte negative electrode structure 20A.

Manufacture of all-Solid-State Rechargeable Battery

The positive electrode layer insulating layer composite structure 10A was disposed so as to be inserted between the two electrolyte negative electrode structures 20A to obtain a stack structure which is an all-solid-state rechargeable battery 1A before pressurization. Then, the negative electrode conductive unit 142 and the negative electrode current collecting unit 211 are disposed to contact each other.

This stack structure was mounted on an aluminum plate (support substrate) having a thickness of 3 mm to which a release film was attached, again covered with a release film, again covered with a metal plate (support substrate) made of SUS having the same shape as utilized in the preparation of the positive electrode layer, and having a thickness of 0.3 mm, and then, vacuum lamination pack was performed including the support substrate. By submerging in a pressurized medium and performing hydros.

tatic treatment (consolidation process by isostatic press) at 490 MPa, a single cell (unit cell) of the all-solid-state rechargeable battery 1 was obtained.

In some embodiments, an aluminum plate and a metal plate made of SUS are utilized as the support substrate, but materials of these support substrates are not limited as long as a material has sufficient (suitable) strength for pressure treatment by isostatic pressure.

OCV Evaluation of all-Solid-State Rechargeable Battery

By welding a metal tab for connection to an external terminal to each of the positive electrode conductive unit 141 and the negative electrode conductive unit 142 by utilizing an ultrasonic welding machine, and then treating vacuum laminate pack on the single cell (unit cell) of the all-solid-state rechargeable battery 1, the all-solid-state rechargeable battery for evaluation was obtained. In this welding, a metal tab of aluminum was welded to the positive electrode conductive unit 141, and a metal tab of nickel was welded to the negative electrode conductive unit 142.

The manufactured all-solid-state battery for evaluation was connected to a low-resistance meter (MODEL3566 manufactured by Tsuruga Electric Corporation), and the open circuit voltage (OCV) was measured. Results are shown in Table 1.

It was confirmed that the open circuit voltage (OCV) of the all-solid-state rechargeable battery prepared in Embodiment 1 is within a sufficiently usable range, and that the external terminal and the all-solid-state battery may electrically conduct with each other through a conductive material unit difficulty.

TABLE 1

| | OCV/mV | |
|---|---|---|
| Embodiment 1 | 233 | |
| Embodiment 2 | 270 | |
| Embodiment 3 | 267 | |
| Embodiment 4 | 249 | |
| Comparative Example 1 | 347 | 338 |
| Comparative Example 2 | Breakage of current collecting in battery manufacturing process | |
| Comparative Example 3 | 321 | 307 |

Evaluation of Charging/Discharging of all-Solid-State Rechargeable Battery

The single cell of the manufactured all-solid-state rechargeable battery 1 is disposed between two metal plates from the outside in the stack direction, a screw with a disc spring is passed through a hole previously drilled in the metal plate, and the screw was tightened so that pressure applied to the battery is 1.0 MPa. The characteristics of the battery were evaluated by the charging/discharging evaluation apparatus TOSCAT-3100 under charging/discharging conditions, as described above, in which a metal tab for connection to an external terminal with respect to the positive electrode conductive unit 141 and the negative electrode conductive unit 142, charged at 45° C. at a constant current of 0.1 C, to the upper limit voltage of 4.25V, and then, charged (dotted line) at a constant voltage until a current of 0.05 C, and discharged (solid line) at 0.1 C to a final voltage of 2.5V. In some embodiments, second charging/discharging evaluation results performed under the same charging/discharging conditions are shown in FIG. 11.

Figure 11:
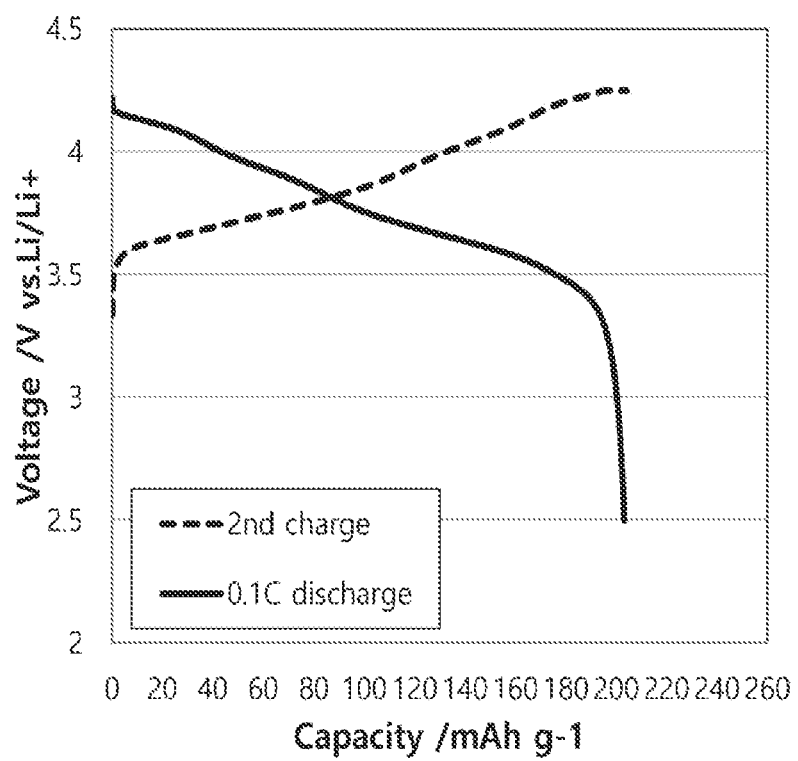
FIG. 11 is a graph showing an evaluation result of the all-solid-state rechargeable battery according to an embodiment.

As a result of FIG. 11, it was confirmed that the all-solid-state rechargeable battery manufactured in Embodiment 1 may be charged and discharged without a short circuit. In some embodiments, because the designed battery capacity is exhibited, it was confirmed that the all-solid-state rechargeable battery may easily electrically conduct with an external terminal with the conductive units 141 and 142 interposed.

Cycle Evaluation of all-Solid-State Rechargeable Battery

Figure 12:
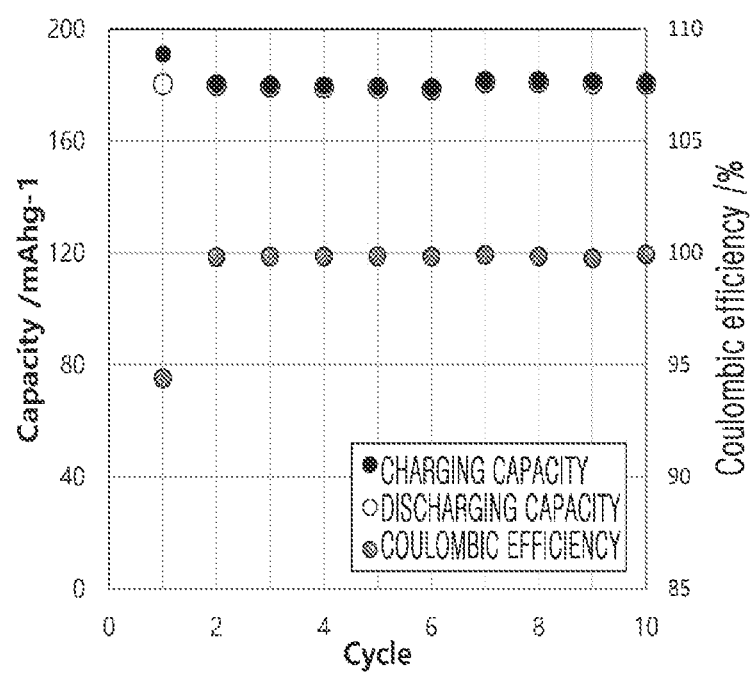
FIG. 12 is a graph showing an evaluation result of the all-solid-state rechargeable battery according to an embodiment.

In some embodiments, because of the cycle evaluation of charging and discharging, as described in the item of charging and discharging evaluation, charging/discharging cycle evaluation was performed in which the all-solid-state rechargeable battery in a pressurized state is charged at 45° C. at a constant current of 0.33 C to the upper limit voltage of 4.25 V, and then, charged at the constant voltage until a current of 0.1 C, and discharged at 0.33 C to a final voltage of 2.5V. The results are shown in FIG. 12. From the results, it was confirmed that the all-solid-state rechargeable battery manufactured in Embodiment 1 performs a stable charging/discharging cycle without a short-circuit.

Embodiment 2

Manufacture of Stacked all-Solid-State Rechargeable Battery

Two single cells of the all-solid-state rechargeable battery manufactured in Embodiment 1 were stacked to manufacture a stacked all-solid-state rechargeable battery.

OCV Evaluation of Stacked all-Solid-State Rechargeable Battery

Results of performing OCV evaluation in substantially the same manner as in Embodiment 1 utilizing this stacked all-solid-state rechargeable battery are shown in Table 1. The same degree of OCV as in Embodiment 1 was observed.

Figure 13:
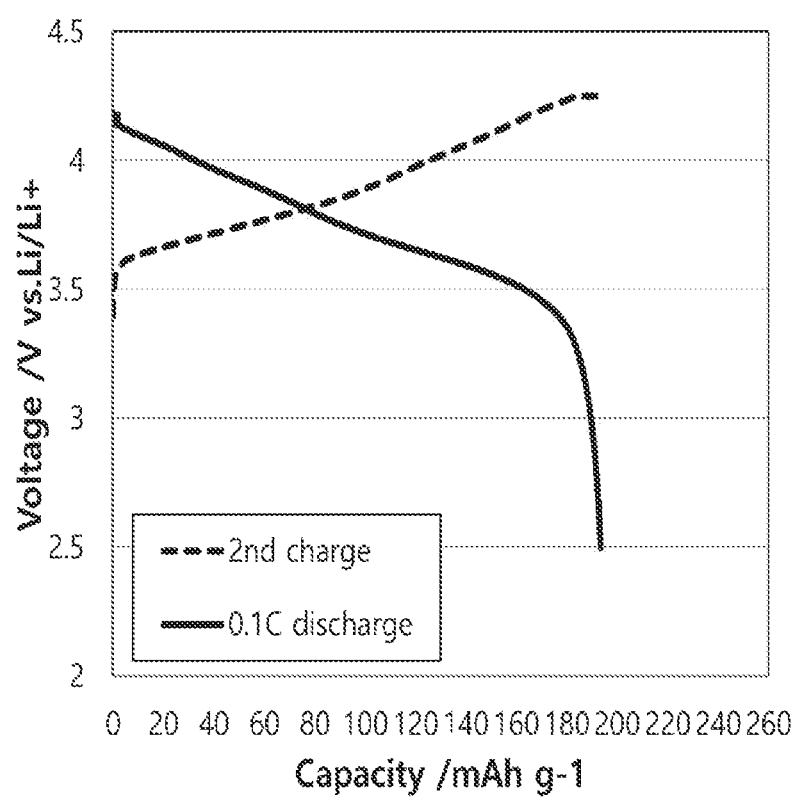
FIG. 13 is a graph showing an evaluation result of the all-solid-state rechargeable battery according to an embodiment.

Evaluation of Charging/Discharging of Stacked all-Solid-State Rechargeable Battery Also, results of performing charging/discharging evaluation in substantially the same manner as in Embodiment 1 are shown in FIG. 13. As a result of FIG. 13, it was confirmed that a plurality of all-solid-state rechargeable batteries manufactured in Embodiment 1 are stacked, and the stacked all-solid-state rechargeable battery may be charged and discharged without a short circuit. In some embodiments, it was confirmed that the external terminals and the plurality of all-solid-state rechargeable batteries may electrically conduct with each other with the respective conductive units interposed therebetween difficulty.

Cycle Evaluation of Stacked all-Solid-State Rechargeable Battery

Figure 14:
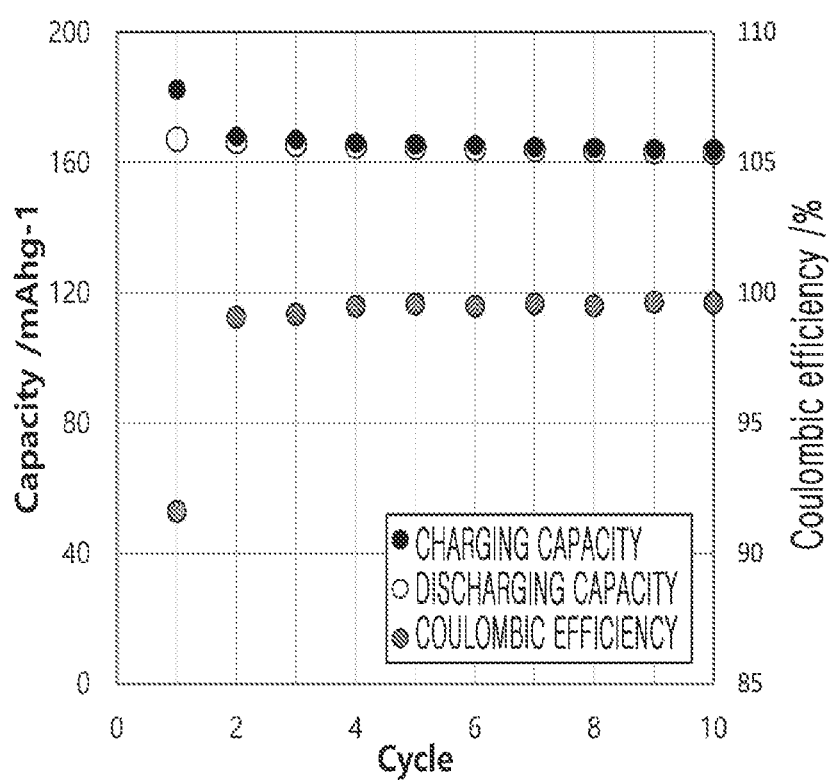
FIG. 14 is a graph showing an evaluation result of the all-solid-state rechargeable battery according to an embodiment.

Charging/discharging cycle evaluation was performed in substantially the same manner as in Embodiment 1 utilizing the stacked all-solid-state rechargeable battery manufactured in Embodiment 2. The results are shown in FIG. 14. As a result of FIG. 14, it was confirmed that the stacked all-solid-state rechargeable battery manufactured in Embodiment 2 performs a relatively stable charging/discharging cycle without a short-circuit.

Embodiment 3

Manufacture of all-Solid-State Rechargeable Battery

The all-solid-state rechargeable battery having one positive electrode layer, one negative electrode layer, and one solid electrolyte layer was manufactured in substantially the same manner as in Embodiment 1, except that the positive electrode active material layer 12 is formed only on one surface of the positive electrode current collector 11, only one insulating layer is utilized, and all of the positive electrode layer, the insulating layer, and the solid electrolyte layer are stacked and then, isostatic press is performed, without performing an isostatic press process of integrating the positive electrode layer and the insulating layer.

OCV Evaluation of all-Solid-State Rechargeable Battery

Results of performing OCV evaluation in substantially the same manner as in Embodiment 1 utilizing this all-solid-state rechargeable battery are shown in Table 1. The same degree of OCV as in Embodiment 1 was observed.

Evaluation of Charging/Discharging of all-Solid-State Rechargeable Battery

Figure 15:
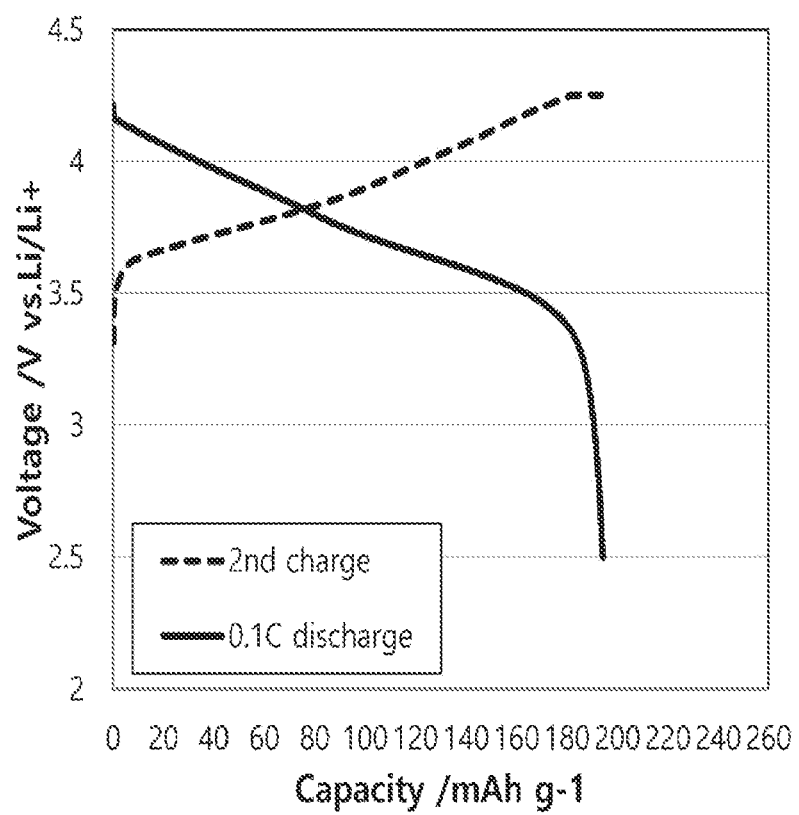
FIG. 15 is a graph showing an evaluation result of the all-solid-state rechargeable battery according to a comparative example.

In some embodiments, results of performing charging/discharging evaluation in substantially the same manner as in Embodiment 1 are shown in FIG. 15. From the results, also in Embodiment 3, it was confirmed that charging/discharging may be performed without a short circuit.

Cycle Evaluation of all-Solid-State Rechargeable Battery

Figure 16:
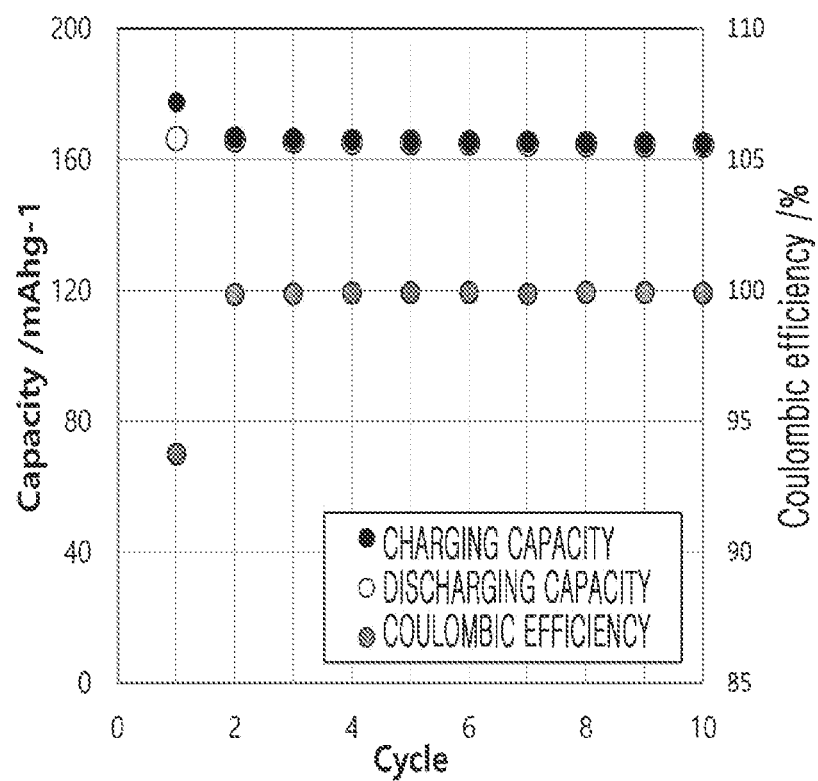
FIG. 16 is a graph showing an evaluation result of the all-solid-state rechargeable battery according to a comparative example.

Charging/discharging cycle evaluation was performed in substantially the same manner as in Embodiment 1 utilizing the stacked all-solid-state rechargeable battery manufactured in Embodiment 3. The results are shown in FIG. 16. As a result of FIG. 16, it was confirmed that the stacked all-solid-state rechargeable battery manufactured in Embodiment 3 performs a stable charging/discharging cycle without a short-circuit.

Embodiment 4

Manufacture of Stacked all-Solid-State Rechargeable Battery

Using the all-solid-state rechargeable battery manufactured in Embodiment 3, the stacked all-solid-state rechargeable battery was manufactured in substantially the same manner as in Embodiment 2.

OCV Evaluation of Stacked all-Solid-State Rechargeable Battery

Results of performing OCV evaluation in substantially the same manner as in Embodiment 1 utilizing this stacked all-solid-state rechargeable battery are shown in Table 1. The same degree of OCV as in Embodiment 1 was observed.

Charging/Discharging Evaluation of Stacked all-Solid-State Rechargeable Battery

Figure 17:
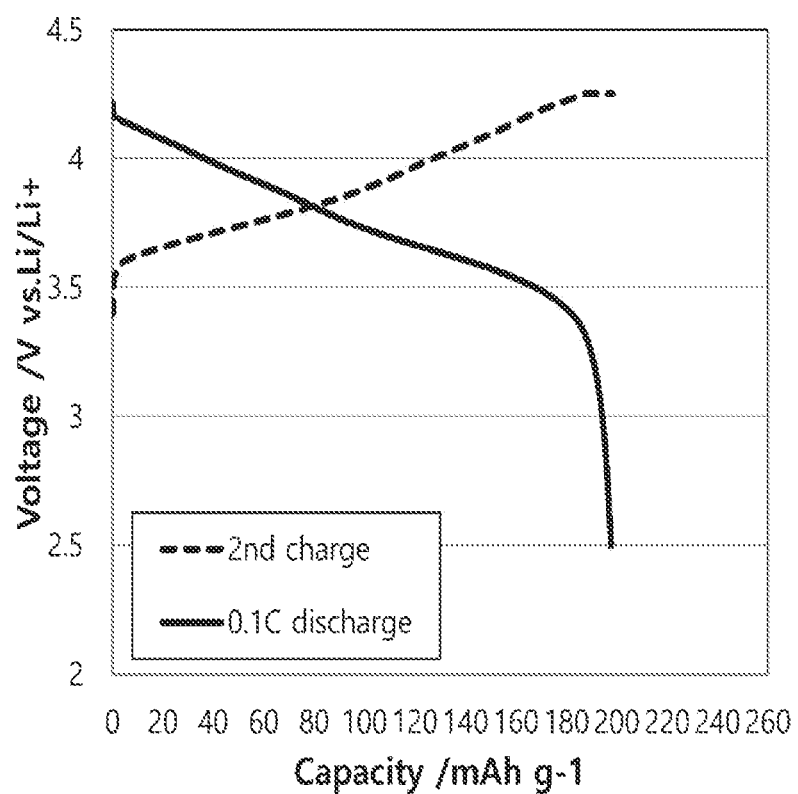
FIG. 17 is a graph showing an evaluation result of the all-solid-state rechargeable battery according to a comparative example.

In some embodiments, results of performing charging/discharging evaluation in substantially the same manner as in Embodiment 1 are shown in FIG. 17. From the results, also in Embodiment 4, it was confirmed that charging/discharging may be performed without a short circuit.

Cycle Evaluation of Stacked all-Solid-State Rechargeable Battery

Figure 18:
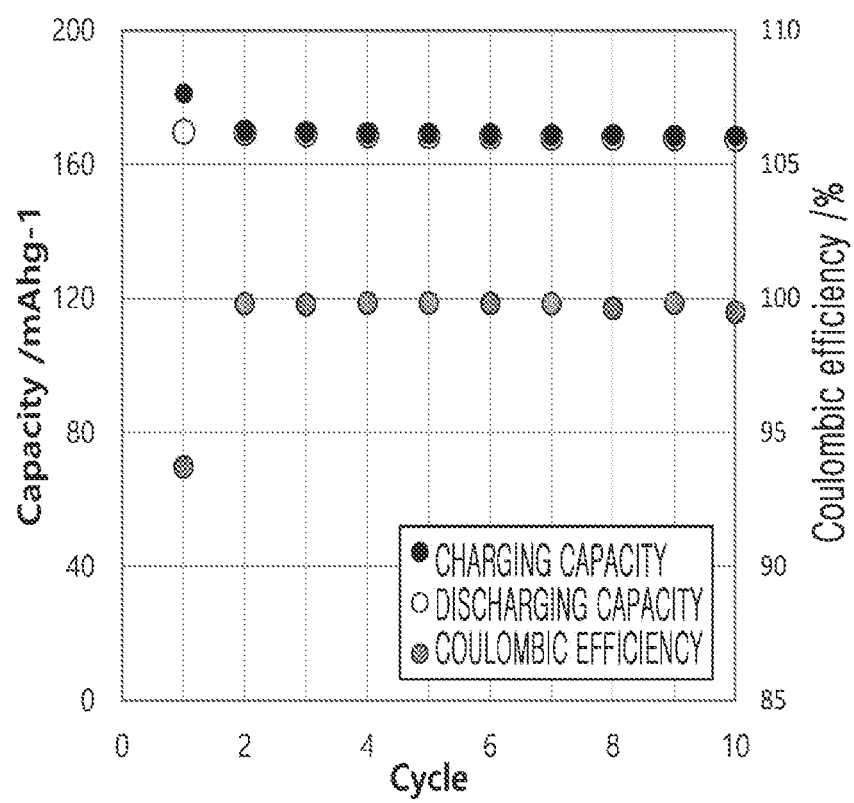
FIG. 18 is a graph showing an evaluation result of the all-solid-state rechargeable battery according to a comparative example.

Charging/discharging cycle evaluation was performed in substantially the same manner as in Embodiment 1 utilizing the stacked all-solid-state rechargeable battery manufactured in Embodiment 4. The results are shown in FIG. 18. As a result of FIG. 18, it was confirmed that the stacked all-solid-state rechargeable battery manufactured in Embodiment 4 performs a stable charging/discharging cycle without a short-circuit.

Comparative Example 1

Manufacture of all-Solid-State Rechargeable Battery

The all-solid-state rechargeable battery manufactured by utilizing an insulating layer material in which no conductive unit or hole for forming the conductive unit is formed in the extension part (corresponding to the part 13F) of the insulating layer, cutting the extension part of the insulating layer from the manufactured all-solid-state rechargeable battery 1, and welding a metal tab directly for connecting the positive electrode current collecting unit 111 and the negative electrode current collecting unit 211 to an external terminal was obtained.

OCV Evaluation of all-Solid-State Rechargeable Battery

The open circuit voltage (OCV) was measured utilizing this all-solid-state rechargeable battery, and connecting to a low-resistance meter (ModelL3566 manufactured by Tsuruga Electric Corporation). The results are shown in Table 1. It has already been confirmed in Japanese Patent Application No. 2020-150093 (the entire content of which is hereby incorporated by reference), which is another application of the present inventor that the all-solid-state rechargeable battery 1 of Comparative Example 1 is excellent or suitable in battery performance. Because the OCV of Comparative Example 1 is equivalent to the OCV of Embodiment 1, Embodiment 1 in which the positive electrode current collecting unit 111 and the negative electrode current collecting unit 211 are connected to external terminals with the conductive units 141 and 142 interposed therebetween was confirmed to have the same performance as that of Comparative Example 1, which has already been confirmed to have excellent or suitable battery performance.

Charging/Discharging Evaluation of all-Solid-State Rechargeable Battery

Figure 19:
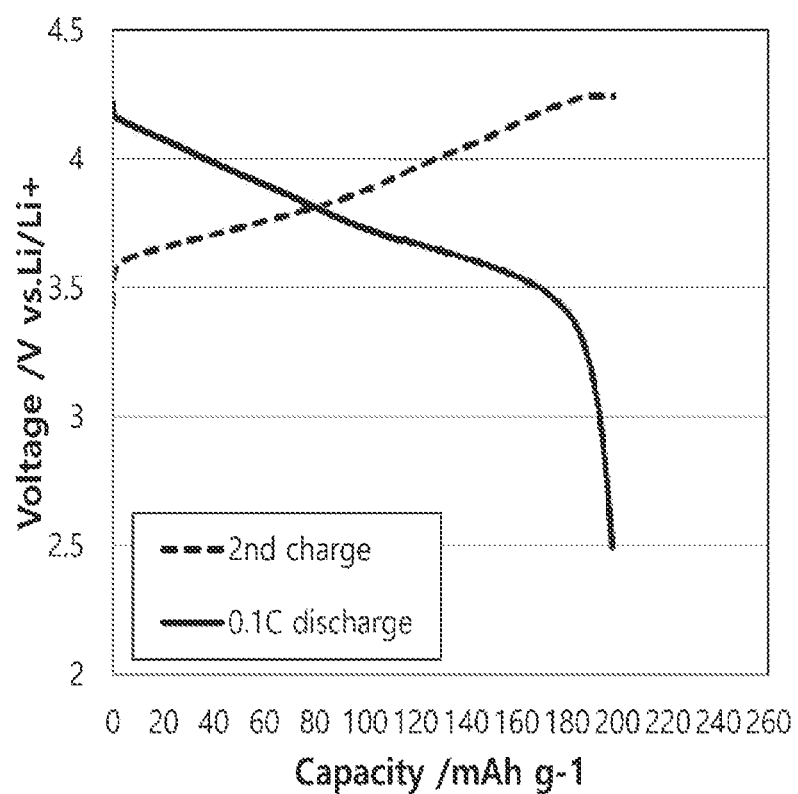
FIG. 19 is a graph showing an evaluation result of the all-solid-state rechargeable battery according to a comparative example.

A charging/discharging test was performed utilizing the all-solid-state rechargeable battery manufactured in Comparative Example 1 and the method described in Embodiment 1. The results are shown in FIG. 19. Because the results are substantially identical to those of Embodiment 1, it was confirmed that the all-solid-state battery may be utilized without difficulty even when connected to an external terminal utilizing a method of cutting the insulating layer 13 protecting a current collector.

Cycle Evaluation of all-Solid-State Rechargeable Battery

Figure 20:
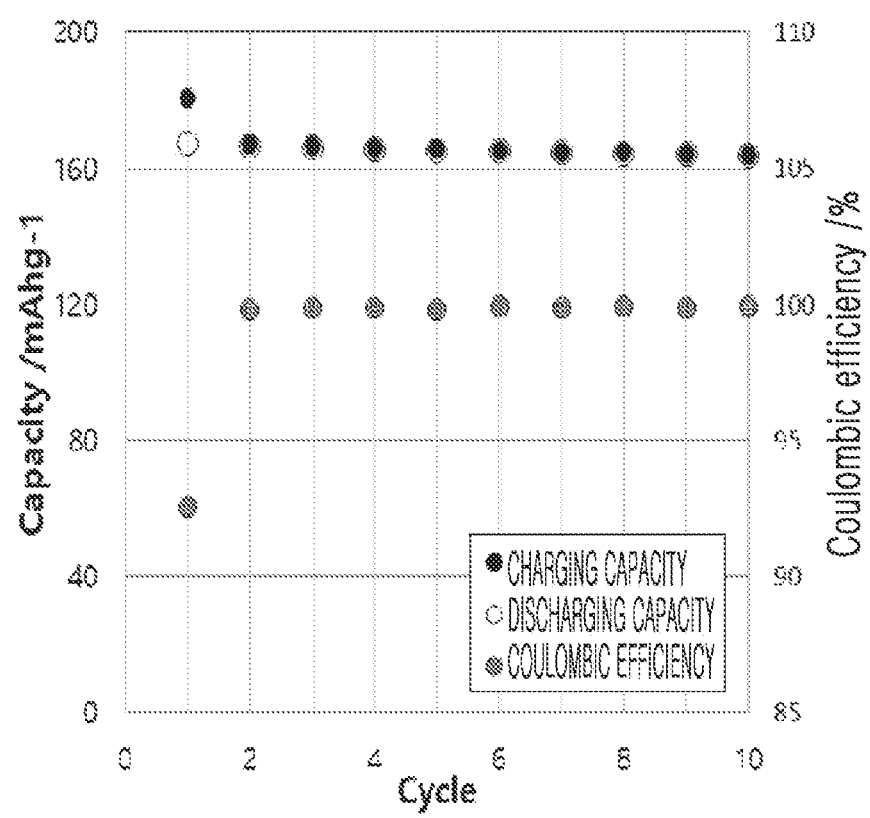
FIG. 20 is a graph showing an evaluation result of the all-solid-state rechargeable battery according to a comparative example.

A charging/discharging cycle test was performed utilizing the all-solid-state rechargeable battery manufactured in Comparative Example 1 and the method as in Embodiment 1. The results are shown in FIG. 20. As a result of FIG. 20, it was confirmed that the all-solid-state rechargeable battery manufactured in Comparative Example 1 performs a stable charging/discharging cycle without a short-circuit. Because the results are substantially identical to the charging/discharging cycle in the all-solid-state rechargeable battery manufactured in Embodiment 1, it may be confirmed from the results that the all-solid-state rechargeable battery 1 manufactured in Embodiment 1 has no difficulty in the charging/discharging cycle. It may be said from the results that the all-solid-state rechargeable battery according to the embodiment of the present disclosure provides the same battery performance as that of Comparative Example 1 described above, and is excellent or suitable in that inconvenience of removing a part of the insulating layer 13 may not be provided (i.e., it is not necessary to remove part of the insulating layer).

Comparative Example 2

Manufacture of all-Solid-State Rechargeable Battery

The all-solid-state battery was manufactured in substantially the same order (steps or tasks) utilizing the insulating layer 13 not having the extension part 13F supporting the current collector instead of the insulating layer 13 utilized in Embodiment 1. In this example, OCV has not been measured because the positive electrode current collecting unit 111 was broken.

Comparative Example 3

Manufacture of all-Solid-State Rechargeable Battery

In Comparative Example 2, the all-solid-state rechargeable battery was repaired by fixing the positive electrode current collecting unit 111 in contact with the positive electrode current collector 11 by fixing the fractured positive electrode current collecting unit 111 inserted between the insulating layers 13 with a Kapton tape. Thereafter, the all-solid-state rechargeable battery for evaluation was obtained by welding and laminate-packing the metal tab to the positive electrode current collecting unit 111.

OCV Evaluation of all-Solid-State Rechargeable Battery

The open circuit voltage (OCV) was measured by connecting the manufactured all-solid-state rechargeable battery 1 to a low-resistance meter (Model 3566 manufactured by Tsuruga Electric Corporation). The substantially same degree of OCV as in Embodiment 1 and Comparative Example 1 was observed by repairing a cutting unit.

Charging/Discharging Evaluation of all-Solid-State Rechargeable Battery

Figure 21:
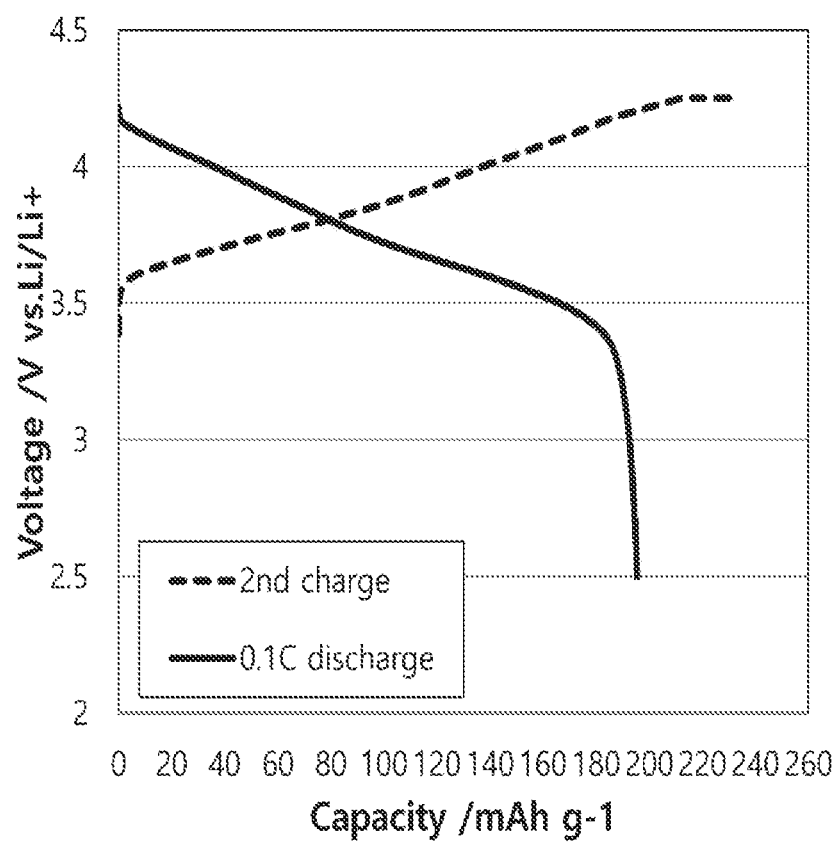
FIG. 21 is a graph showing an evaluation result of the all-solid-state rechargeable battery according to a comparative example.

A charging/discharging test was performed utilizing the all-solid-state rechargeable battery manufactured in Comparative Example 3 and the method described in Embodiment 1. The results are shown in FIG. 21. As a result of FIG. 21, in comparative example 3, also in second charging, a charging capacity is excessive, and it is considered that a minute short circuit occurs.

Cycle Evaluation of all-Solid-State Rechargeable Battery

Figure 22:
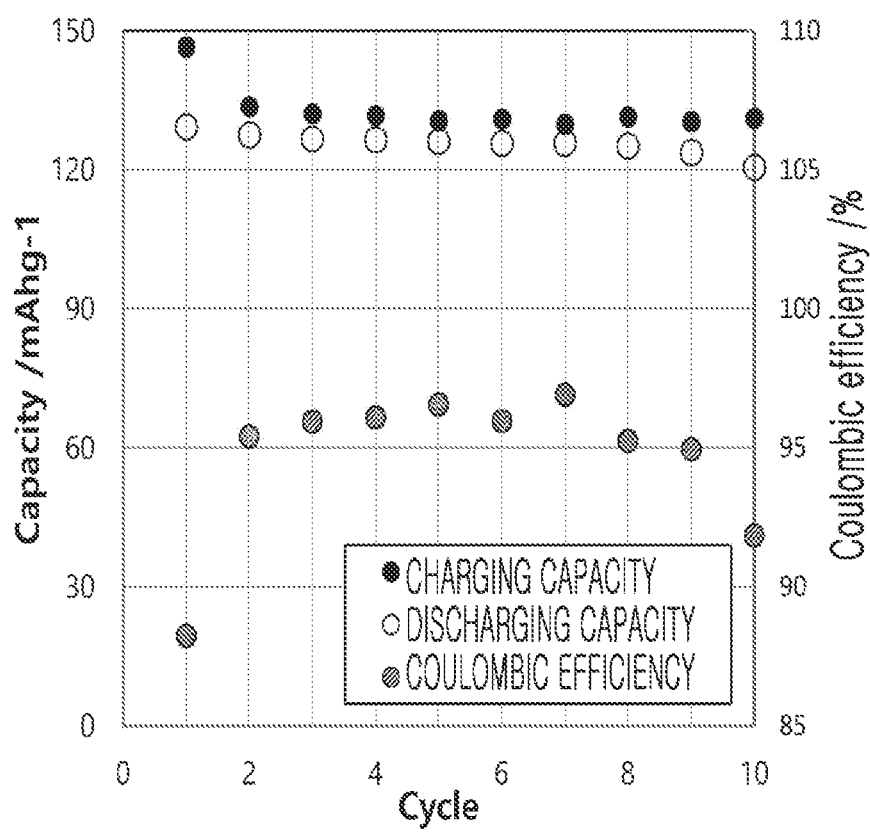
FIG. 22 is a graph showing an evaluation result of the all-solid-state rechargeable battery according to a comparative example of the present.

A charging/discharging cycle test was performed on the all-solid-state rechargeable battery manufactured in Comparative Example 3 utilizing the method as in Embodiment 1. The results are shown in FIG. 22. In the all-solid-state rechargeable battery manufactured in Comparative Example 3, the coulombic efficiency was lowered for several cycles, and a short circuit occurred. As a result of this, there was no difficulty in the OCV in repairing the current collecting unit that was broken during the manufacturing process of the all-solid-state rechargeable battery, but it is considered that this is because, due to insufficient contact, a physical problem occurs in the all-solid-state rechargeable battery through the site in a charging/discharging process.

It was confirmed from the results of these Embodiments (embodied Examples) and Comparative Examples that, according to the present disclosure, even when a pressurization treatment is performed in the manufacturing process of the all-solid-state rechargeable battery, it may be more difficult to break the positive electrode current collecting unit 111 and the negative current collecting unit 211 than in the prior art by supporting the positive electrode current collecting unit 111 and the negative current collecting unit 211 with the insulating layer 13. In some embodiments, it was confirmed that by providing the conductive unit 14 in the insulating layer 13, while retaining the insulating layer 13 supporting the positive electrode current collecting unit 111 and the negative current collecting unit 211 without removing a part of the insulating layer 13, electrically connecting the positive electrode current collecting unit 111 and the negative current collecting unit 211 to an external terminal, and even when configured as such, the all-solid-state rechargeable battery 1 of the prior art may exhibit substantially equivalent battery performance. As a result, it may be said that it is possible to manufacture the all-solid-state rechargeable battery 1 and the stacked all-solid-state rechargeable battery with fewer defects than in the related art through a relatively simple process.

The use of "may" when describing embodiments of the present disclosure refers to "one or more embodiments of the present disclosure."

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this disclosure is intended to include all higher numerical limitations subsumed therein. Accordingly, Applicant reserves the right to amend this disclosure, including the claims, to expressly recite any sub-range subsumed within the ranges expressly recited herein.

The rechargeable battery or any other relevant battery control or management devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Although the embodiments of the present disclosure have been described, it is understood that the present disclosure should not be limited to these embodiments, but one or more suitable changes and modifications can be made by one ordinary skilled in the art within the spirit and scope of the present disclosure as defined by the following claims and equivalents thereof.

REFERENCE NUMERALS

1: all-solid-state rechargeable battery
10: positive electrode layer
11: positive electrode current collector
12: positive electrode active material layer
13: insulating layer
20: negative electrode layer
21: negative electrode current collector
22: negative active material layer
30: solid electrolyte layer
111: positive electrode current collecting unit
141: positive electrode conductive unit
142: negative electrode conductive unit
211: negative electrode current collecting unit

What is claimed is:

1. An all-solid-state rechargeable battery comprising:
a positive electrode layer;
a negative electrode layer;
a solid electrolyte layer stacked between the positive electrode layer and the negative electrode layer;
an insulating layer on a side end surface of the positive electrode layer, the insulating layer covering the positive electrode layer;
a thin-type positive electrode current collecting unit protruding laterally from the positive electrode layer, the positive electrode layer comprising two surfaces; and
a thin-type negative electrode current collecting unit protruding laterally from the negative electrode layer,
wherein the insulating layer supports the thin-type positive electrode current collecting unit and the thin-type negative electrode current collecting unit from at least one side of the thin-type positive electrode current collecting unit and at least one side of the thin-type negative electrode current collecting unit,
a plurality of conductive units electrically connecting each of the positive electrode current collecting unit and the negative electrode current collecting unit to an external wiring are formed in the insulating layer, and
the plurality of conductive units are configured to penetrate the insulating layer in a stack direction.

2. The all-solid-state rechargeable battery of claim 1, wherein:
the plurality of conductive units are at positions not in direct contact with each other.

3. The all-solid-state rechargeable battery of claim 1, wherein:
the solid electrolyte layer is stacked on each of the two surfaces of the positive electrode layer,
the negative electrode layer is stacked on an opposite surface to the positive electrode layer of the solid electrolyte layer, and
the insulating layer is configured to support the positive electrode current collecting unit inserted therewith from the stack direction.

4. The all-solid-state rechargeable battery of claim 1, wherein:
the conductive unit is composed of a material having an electrical conductivity equal to or greater than 106 S/m.

5. The all-solid-state rechargeable battery of claim 4, wherein:
the conductive unit comprises a composite comprising at least one selected from the group consisting of metal, alloy, metal powder, carbon material, and electronically conductive polymer, or a composite comprising at least one selected from the group consisting of metal, alloy, metal powder, carbon material, and electronically conductive polymer and a resin.

6. The all-solid-state rechargeable battery of claim 5, wherein:
the metal is at least one selected from the group consisting of aluminum, nickel, copper and stainless steel.

7. The all-solid-state rechargeable battery of claim 1, wherein:
the insulating layer comprises resin and has a volume resistivity equal to or greater than $10^{12}$ Ω/cm.

8. The all-solid-state rechargeable battery of claim 7, wherein:
the insulating layer further comprises an insulating filler.

9. The all-solid-state rechargeable battery of claim 8, wherein:
the insulating filler comprises one or more materials selected from the group consisting of fibrous resin, resin nonwoven fabric, alumina, magnesium oxide, silica, boehmite, barium titanate, barium carbonate, yttrium oxide, and manganese oxide.

10. The all-solid-state rechargeable battery of claim 1, wherein:
a part or all of an outer edge of the insulating layer is located outside an outer edge of the negative electrode layer in a direction in which the current collecting unit protrudes.

11. The all-solid-state rechargeable battery of claim 10, wherein:
a part or all of the outer edge of the negative electrode layer is on the insulating layer.

12. The all-solid-state rechargeable battery of claim 1, wherein:
the solid electrolyte layer comprises a sulfide-based solid electrolyte comprising at least lithium, phosphorus and sulfur.

13. The all-solid-state rechargeable battery of claim 1, wherein:
two of the plurality of conductive units are configured to face each other in the stack direction with a current collecting unit interposed therebetween.

14. The all-solid-state rechargeable battery of claim 1, wherein:
the negative electrode layer comprises a negative electrode active material that forms an alloy with lithium and/or a negative electrode active material that forms a compound with lithium,
metallic lithium is educible inside the negative electrode layer during charging, and
a charging capacity of the negative electrode layer equal to or greater than 80% is exhibited by metallic lithium.

15. The all-solid-state rechargeable battery of claim 14, wherein:
the negative electrode layer comprises one or more selected from the group consisting of amorphous carbon, gold, platinum, palladium, silicon, silver, aluminum, bismuth, tin, and zinc.

16. A stacked all-solid-state rechargeable battery in which two or more all-solid-state rechargeable batteries of claim 1 are stacked.

* * * * *